US006553436B2

(12) United States Patent  
Ando et al.

(10) Patent No.: US 6,553,436 B2
(45) Date of Patent: Apr. 22, 2003

(54) APPARATUS AND METHOD FOR PLAYBACK OF WAVEFORM SAMPLE DATA AND SEQUENCE PLAYBACK OF WAVEFORM SAMPLE DATA

(75) Inventors: Tokiharu Ando, Hamamatsu (JP); Takashi Suzuki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/948,157

(22) Filed: Sep. 6, 2001

(65) Prior Publication Data

US 2002/0007426 A1 Jan. 17, 2002

Related U.S. Application Data

(62) Division of application No. 09/222,753, filed on Dec. 29, 1998, now Pat. No. 6,366,971.

(30) Foreign Application Priority Data

Jan. 9, 1998 (JP) .......................................... 10-013544
Jan. 9, 1998 (JP) .......................................... 10-013545

(51) Int. Cl.⁷ .............................. G06F 13/00; G06F 3/00
(52) U.S. Cl. ............................ 710/25; 710/35; 710/52; 710/53; 84/604
(58) Field of Search ............................ 710/22, 35, 52, 710/53, 25; 84/601–605

(56) References Cited

U.S. PATENT DOCUMENTS

| 4,583,163 A | | 4/1986 | Kobayashi et al. |
| 4,805,509 A | * | 2/1989 | Matsuda .................... 84/1.01 |
| 5,321,198 A | | 6/1994 | Suzuki et al. |

(List continued on next page.)

FOREIGN PATENT DOCUMENTS

JP 58-46727 10/1983

JP 01072254 A 3/1989
JP 03113664 A 5/1991

(List continued on next page.)

OTHER PUBLICATIONS

Notice of Rejection from Japanese Patent Office regarding Japanese Patent Application No. 013544, dated Oct. 17, 2000.
Notice of Rejection from Japanese Patent Office regarding Japanese Patent Application No. 013544, dated Jan. 23, 2001.
Decision of Rejection from Japanese Patent Office regarding Japanese Patent Application No. 013544, dated May 15, 2001.

Primary Examiner—Thomas Lee
Assistant Examiner—Chun Cao
(74) Attorney, Agent, or Firm—Morrison & Foerster LLP

(57) ABSTRACT

An audio record/playback system is configured using a RAM containing PC buffers and a sound input/output board which is equipped with another RAM containing P buffers and R buffers as well as a digital audio circuit. At a playback mode, waveform sample data consisting of waveform samples are subjected to burst transfer using a PCI bus from the PC buffer to the P buffer in a first half duration of each sampling period with respect to one channel. In a second half duration, one of the waveform samples is transferred from the P buffer to the digital audio circuit, wherein it is subjected to digital audio processing. Thus, the waveform sample data are played back in response to prescribed timings synchronized with sampling periods. At a record mode, waveform sample data corresponding to sounds to be picked up are supplied to the digital audio circuit, from which they are transferred to the R buffer. Then, the waveform sample data are transferred to the PC buffer. At a sequence playback mode, a set of WAVE data are loaded from an external storage unit to the RAM with respect to multiple channels in response to a sequence playback instruction. Then, the WAVE data are transferred to the sound input/output board, by which they are played back. Incidentally, when playback is completed with respect to one channel, next WAVE data regarding another channel are automatically loaded to the RAM.

11 Claims, 12 Drawing Sheets

U.S. PATENT DOCUMENTS

| | | | |
|---|---|---|---|
| 5,604,866 A | | 2/1997 | Kolb et al. |
| 5,625,158 A | * | 4/1997 | Ichiki .......................... 84/603 |
| 5,668,336 A | | 9/1997 | Miyano |
| 5,698,802 A | | 12/1997 | Kamiya |
| 5,748,834 A | * | 5/1998 | Miyazaki et al. ............. 386/96 |
| 5,768,628 A | | 6/1998 | Priem |
| 5,847,304 A | * | 12/1998 | Hewitt ......................... 84/622 |
| 5,892,170 A | | 4/1999 | Ichiki et al. |
| 5,898,892 A | * | 4/1999 | Gulick et al. ................. 710/52 |
| 5,945,619 A | * | 8/1999 | Tamura ........................ 84/604 |
| 5,973,251 A | | 10/1999 | Mukojima et al. |
| 6,016,522 A | | 1/2000 | Rossum |
| 6,023,016 A | | 2/2000 | Tamura |
| 6,040,515 A | | 3/2000 | Mukojima et al. |
| 6,292,854 B1 | * | 9/2001 | Priem .......................... 710/22 |
| 6,366,971 B1 | * | 4/2002 | Ando et al. ................... 710/53 |

FOREIGN PATENT DOCUMENTS

| | | |
|---|---|---|
| JP | 09179556 A | 7/1997 |
| JP | 10-020860 | 1/1998 |
| WO | WO 96/18995 | 6/1996 |
| WO | WO 97/31363 | 8/1997 |

* cited by examiner

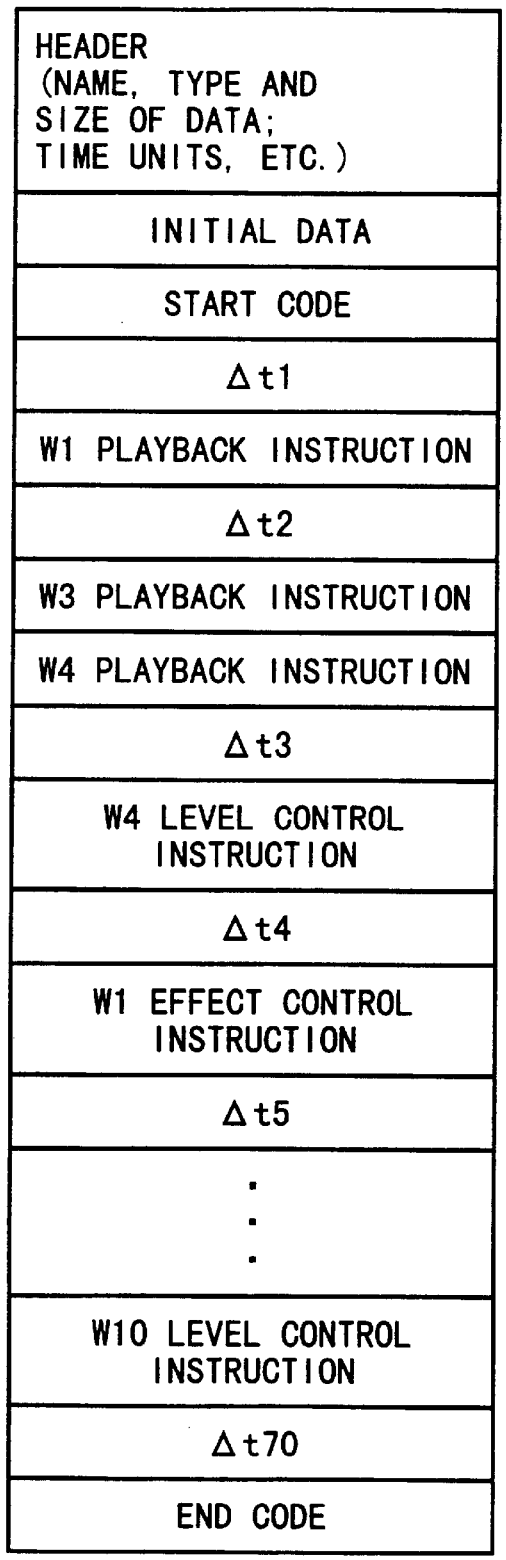
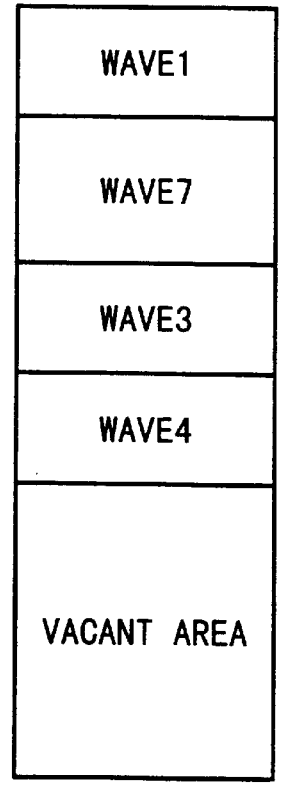
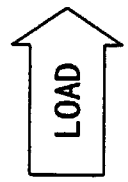
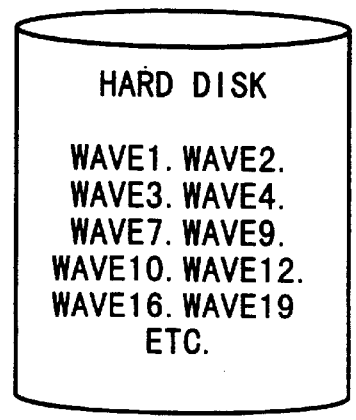
FIG.7A  FIG.7B

APPARATUS AND METHOD FOR PLAYBACK OF WAVEFORM SAMPLE DATA AND SEQUENCE PLAYBACK OF WAVEFORM SAMPLE DATA

This application is a division of application Ser. No. 09/222,753, filed on Dec. 29, 1998, now U.S. Pat. No. 6,366,971.

BACKGROUND OF THE INVENTION

1. Field of the Invention

This invention relates to apparatuses and methods for playback of waveform sample data employed in audio record/playback systems.

This application is based on Patent Application No. Hei 10-13544 and Patent Application No. Hei 10-13545 both filed in Japan, the contents of which are incorporated herein by reference.

2. Description of the Related Art

Some personal computers are equipped with coder-decoders (each abbreviated by "CODEC") and CODEC driver software to enable monaural or stereo sound record/playback operations with respect to waveform sample data (or WAVE data). Herein, the coder-decoders are configured by analog-to-digital converters (each abbreviated by "A/D converter" or "ACD") and digital-to-analog converters (each abbreviated by "D/A converter" or "DAC"), while the CODEC driver software is provided to drive the CODEC.

The conventional record/playback method of the WAVED data using the CODEC and CODEC driver is designed to use the bus every sampling period (known as "DAC cycle", e.g., 44.1 kHz) so as to transfer one sample of the WAVE data to the CODEC. Similarly, at a record mode, the conventional method performs transfer of one waveform sample data every sampling period.

In the conventional record/playback method of the waveform sample data, the bus is used every sampling period to transfer the waveform sample data. For this reason, switching of the bus use right frequently occurs, which cause reduction of an operation efficiency of the system as a whole.

In addition, a number of channels which can be used for record and playback is limited to one corresponding to monaural sound or L/R interleaved stereo sound. In other words, it is impossible to perform record and playback with respect to multiple "independent" channels (or multiple tracks). In order to perform record and playback with respect to two "independent" channels, it is necessary to provide two "independent" DMA channels (where "DMA" is an abbreviation for "Direct Memory Access").

By the way, it is also known that the waveform edit software performs playback by locating multiple WAVE data on arbitrary positions on the time axis. Such waveform edit software exclusively uses the specific hardware that is capable of reproducing the multiple WAVE data simultaneously.

In the conventional playback method of the waveform sample data, a CPU generates trigger signals for waveform playback. For this reason, it is impossible to control the playback start timing of the WAVE data with a high precision. In addition, it is also impossible to determine the playback end timing with a high precision. In the multitask processing, the CPU has other processes which are executed simultaneously in addition to sending processes of waveform samples and playback control processes of WAVE data. For this reason, the conventional system is incapable of always and immediately executing the process to send the waveform sample at the given timing. As described above, it is impossible to force the CPU to perform the precise time control with respect to WAVE playback.

Particularly, the conventional system suffers from a problem in the case where the multiple WAVE data are simultaneously played back although the control precision for the playback timing is low. In that case, the playback timing of the WAVE data fluctuates, which cause changes in states of mutual interference between waveforms. So, playback sounds should be heard differently every time the playback is made.

SUMMARY OF THE INVENTION

It is an object of the invention to provide an apparatus and a method for playback of waveforms that have a capability to play back waveform sample data without reducing an operation efficiency of the audio record/playback system.

It is another object of the invention to provide the apparatus and method for playback of waveforms that have a capability to simultaneously play back audio signals on multiple tracks in an independent manner.

It is a further object of the invention to provide the apparatus and method for playback of waveforms that have a capability to control the playback start timing and playback end timing with a high precision.

It is a still further object of the invention to provide the apparatus and method for playback of waveforms that have a capability to perform high-precision waveform playback even in the case where waveform sample data of multiple channels are simultaneously output.

An audio record/playback system incorporating features of this invention is configured using a RAM containing PC buffers and a sound input/output board which is equipped with another RAM containing P buffers and R buffers as well as a digital audio circuit. At a playback mode, waveform sample data consisting of waveform samples are subjected to burst transfer using a PCI bus from the PC buffer to the P buffer in a first half duration of each sampling period with respect to one channel. In a second half duration of the sampling period, one of the waveform samples is transferred from the P buffer to the digital audio circuit, wherein it is subjected to digital audio processing. Thus, the waveform sample data are played back in response to prescribed timings synchronized with sampling periods. At a record mode, waveform sample data corresponding to sounds to be picked up are supplied to the digital audio circuit, from which they are transferred to the R buffer. Then, the waveform sample data are transferred to the PC buffer on which they are recorded. At a sequence playback mode, a set of WAVE data are loaded from an external storage unit to the RAM with respect to multiple channels in response to a sequence playback instruction. Then, the WAVE data are transferred to the sound input/output board, by which they are played back. Incidentally, when playback is completed with respect to one channel so that a vacant area is created in the RAM, next WAVE data regarding another channel are automatically loaded to the vacant area of the RAM.

Thus, it is possible to perform playback of waveform sample data of multiple channels with a high precision and high efficiency without causing substantial reduction of operation efficiency of the system.

BRIEF DESCRIPTION OF THE DRAWINGS

These and other objects, aspects and embodiment of the present invention will be described in more detail with reference to the following drawing figures, of which:

FIG. 7A shows an example of a configuration of sequence data;

FIG. 7B shows an example of WAVE storage areas on a first RAM shown in FIG. 1;

DESCRIPTION OF THE PREFERRED EMBODIMENT

This invention will be described in further detail by way of examples with reference to the accompanying drawings.

Figure 1:
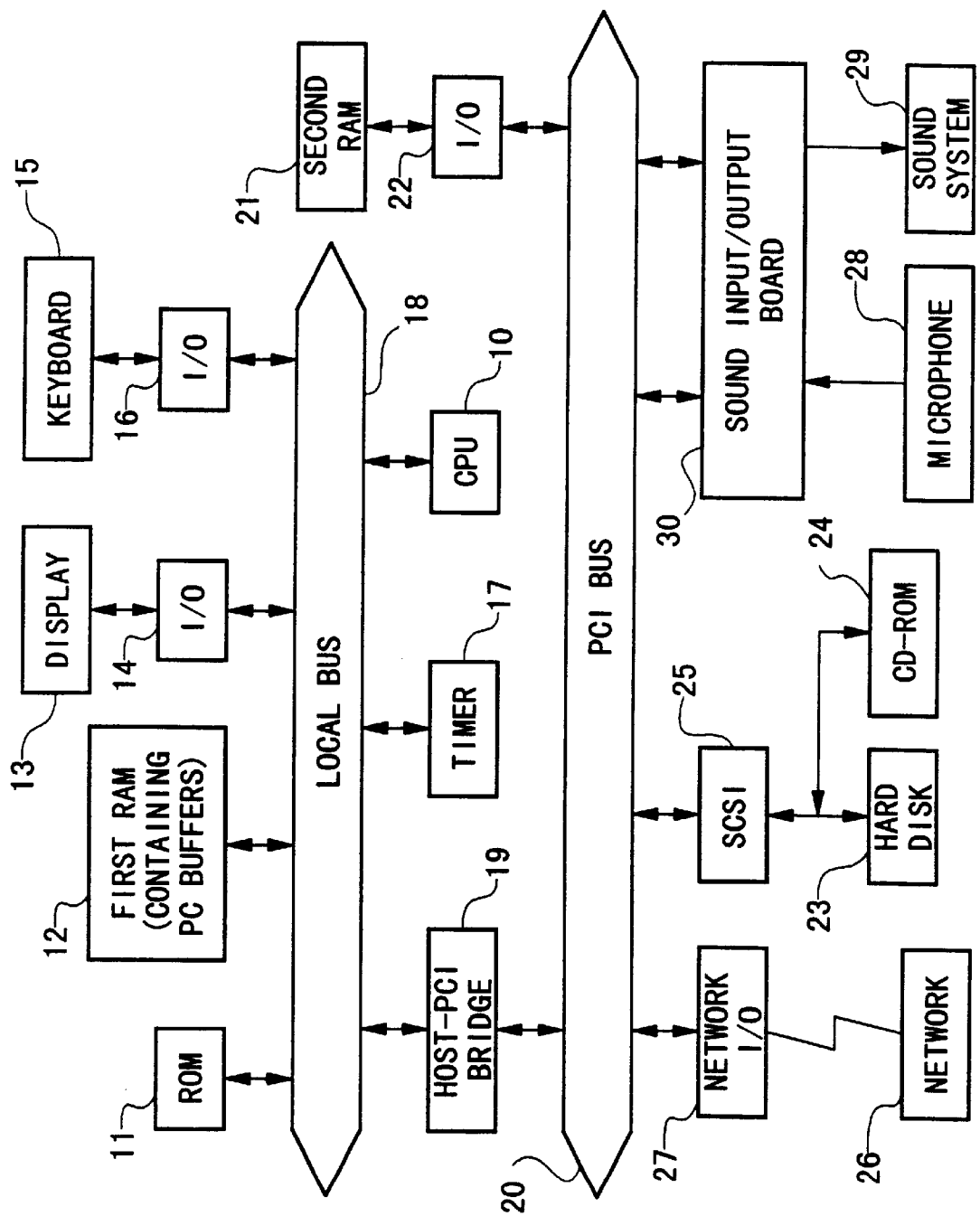
FIG. 1 is a block diagram showing an overall configuration of a waveform record/playback system employiong a waveform playback apparatus (or method) in accordance with embodiment of the invention.

FIG. 1 is a block diagram showing an overall configuration of a waveform record/playback system employing a waveform playback apparatus corresponding to a waveform playback method in accordance with the preferred embodiment of the invention. The system of FIG. 1 contains a central processing unit (CPU) for controlling the waveform playback apparatus as a whole, a read-only memory (ROM) 11 for storing a variety of programs and constant data, a first random-access memory (RAM) 12 which loads data and programs to be executed and which is used as a variety of buffer areas and/or work areas, a display unit 13 for displaying several pieces of information and an interface circuit (I/O) 14, a keyboard 15, an interface circuit (I/O) 16 and a timer 17. Herein, the interface circuit 14 is used for connecting the display unit 13 to a local bus 18; the keyboard 15 is used for inputting a variety of commands and instructions; the interface circuit 16 is used for connecting the keyboard 15 to the local bus 18; and the timer 17 is used for measuring time and for making timer interruption. All of the CPU 10, ROM 11, first RAM 12, interface circuits 14, 15 and timer 17 are connected to the local bus 18.

Buffer areas (called "PC buffers") used for storing waveform sample data of multiple channels are secured on the first RAM 12. The PC buffer can be set such that it is located at an arbitrary position with an arbitrary size (or area) within a memory address space of the CPU 10. Incidentally, any types of data can be employed as the waveform sample data. That is, one word of the waveform sample data may correspond to 32 bits, 16 bits or else. For convenience' sake, the present embodiment is described in such a way that one word of the waveform sample data corresponds to 16 bits.

A reference numeral "20" in FIG. 1 designates a PCI bus (where "PCI" is an abbreviation for "Peripheral Component Interconnect"). In addition, a reference numeral "19" designates a HOST-PCI bridge circuit that is used for connecting the local bus 18 and the PCI bus 20 together. Size of the PCI bus 20 can be extended to 64 bits, however, the present embodiment describes that the PCI bus 20 corresponds to a data bus of 32 bits. That is, the PCI bus 20 uses a single data bus of 32 bits for transmission of addresses and data in a time division manner. At a data transfer mode, for example, an address is output onto the data bus to designate a transfer destination, then, data transfer is executed using the data bus.

Further, the system of FIG. 1 contains a second random-access memory (RAM) 21, which is connected to the PCI bus 20 by an interface circuit (I/O) 22. Furthermore, the system of FIG. 1 contains a hard-disk drive 23 containing a hard disk (or hard disks) for storing a variety of waveform sample data and programs and a CD-ROM drive 24 for driving a CD-ROM storing a variety of waveform sample data and programs. A SCSI interface circuit (where "SCSI" is an abbreviation for "Small Computer System Interface") 25 is used for connecting external storage devices such as the hard-disk drive 23 and the CD-ROM drive 24. A network interface circuit 27 is used for establishing connections with an external network 26 by means of transmission lines such as telephone lines and private lines. Incidentally, the system can be redesigned to further contain a MIDI interface for inputting and outputting MIDI signals (where "MIDI" is an abbreviation for "Musical Instrument Digital Interface").

Moreover, the system of FIG. 1 contains a waveform input/output circuit (or sound input/output board) 30, which works in connection with the first RAM 12 as well as a microphone 28 and a sound system 29. That is, the sound input/output board 30 reads waveform sample data from the PC buffers of the first RAM 12, so that it performs some processes such as effect imparting operations on the read waveform sample data according to needs. Then, the processed data are output to the sound system. Or, the sound input/output board 30 inputs audio signals from an audio input terminal by means of the microphone 28 and the like, so that it converts them to waveform sample data, which are then transferred to and stored in the PC buffers of the first RAM 12. The microphone 28 is connected to a sound input terminal of the sound input/output board 30. The sound system 29 produces sounds by amplifying audio signals output from the sound input/output board 30. Incidentally, an internal configuration of the sound input/output board 30 will be described later.

As shown in FIG. 1, the PCI bus 20 is connected with the HOST-PCI bridge circuit 19, interface circuit 22, network interface circuit 27, SCSI interface circuit 25 and sound input/output board 30. Herein, any one of the HOST-PCI bridge circuit 19, network interface circuit 27, SCSI interface circuit 25 and sound input/output board 30 is capable of acting a role as a bus master with respect to the PCI bus 20. For example, a bus use request is issued for a bus arbiter equipped in the HOST-PCI bridge circuit 19, so that after securing a bus use right, the system is capable of using the PCI bus 20 to perform data transfer.

Bus interconnection configuration applicable to the invention is not limited to one shown in FIG. 1. So, it is possible to provide a variety of bus interconnection configurations. For example, it is possible to divide the local bus 18 shown in FIG. 1 to two buses, i.e., a bus exclusively used for the CPU 10 and another (local) bus used for connecting peripheral devices such as I/O.

In addition, the present embodiment of FIG. 1 shows that the hard-disk drive 23 and the CD-ROM drive 24 are connected with the PCI bus 20. However, it is possible to modify the present embodiment such that the local bus 18 is connected to the SCSI interface circuit (25), to which the external storage devices such as the hard-disk drive, CD-ROM drive and DVD drive are connected.

Figure 2:
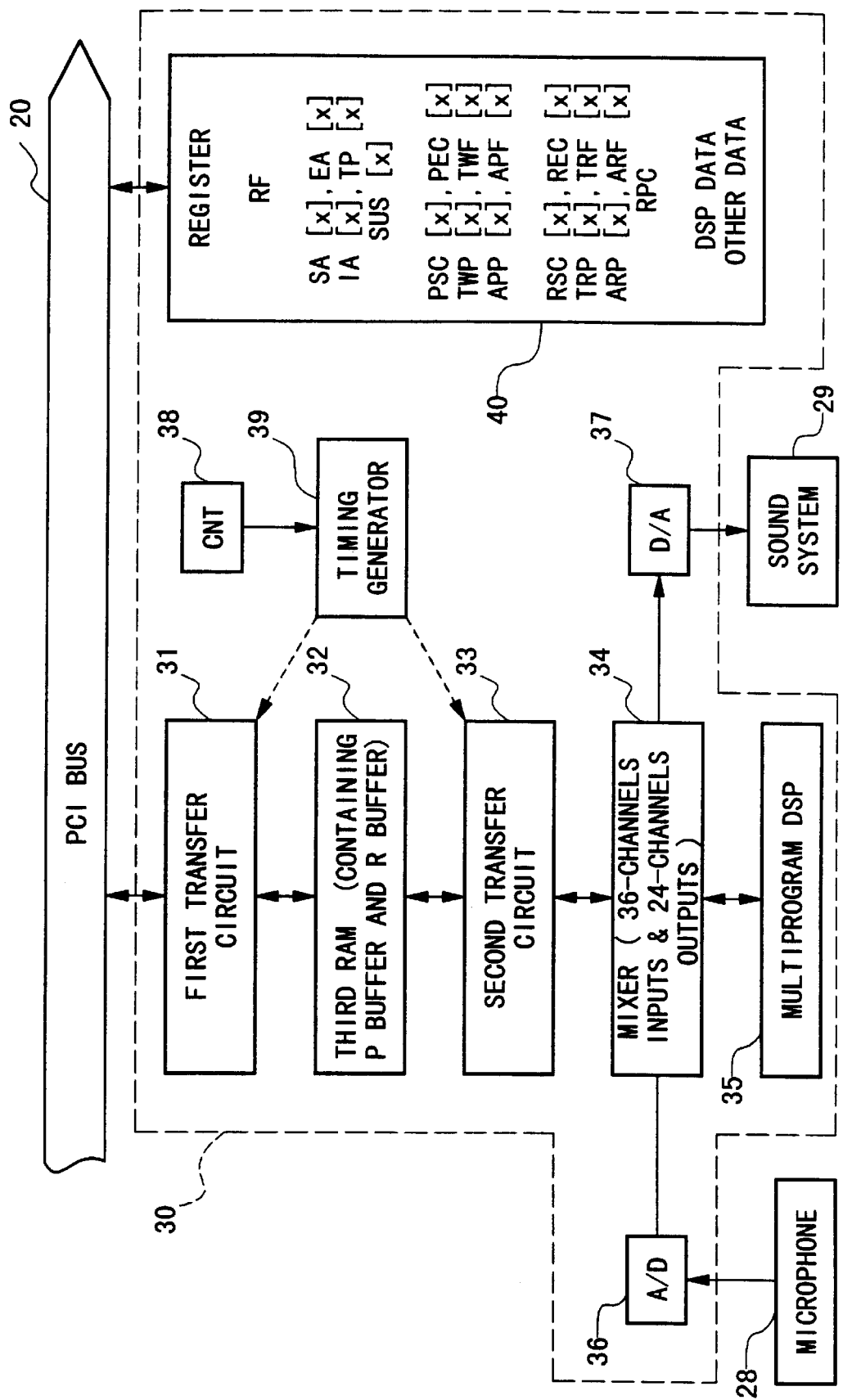
FIG. 2 is a block diagram showing an example of an internal configuration of a sound input/output board shown in FIG. 1.

Next, a description will be given with respect to the internal configuration of the sound input/output board 30. FIG. 2 is a block diagram showing an example of the internal configuration of the sound input/output board 30. In FIG. 2, the sound input/output board 30 contains a first transfer circuit 31 connected to the PCI bus 20 and a third random-access memory (RAM) 32 which is used as a buffer memory. The third RAM 32 contains two kinds of buffers, i.e., a play buffer (or P buffer) and a record buffer (or R buffer). In those buffers, storage capacity of 1k word (i.e., 1024 words) is provided for one channel, for example. In the present embodiment, there are provided twenty channels in total, i.e., sixteen channels for playback (or play) and four channels for record. Thus, each of the buffers is capable of storing waveform sample data of 1k word per one channel. A second transfer circuit 33 performs data transfer between the P buffer and R buffer of the third RAM 32 and a mixer 34. Access to the third RAM 32 is subjected to time-division multiplexing using a half period of the sampling period (i.e., DAC cycle) as time unit. Within one DAC cycle, first half is used by the second transfer circuit 33 to perform memory access while second half is used by the first transfer circuit 31 to perform memory access.

The sound input/output board 30 shown in FIG. 2 further contains a signal processor (e.g., DSP where "DSP" is an abbreviation for "Digital Signal Processor"), an A/D converter 36 and a D/A converter 37 in addition to the aforementioned mixer 34. For example, the mixer 34 provides thirty-six channels for inputs and twenty-four channels for outputs. The mixer 34 inputs three kinds of waveform sample data. Namely, first waveform sample data are produced by the A/D converter 36 that performs analog-to-digital conversion on the audio signals output from the microphone 28; second waveform sample data are transferred from the P buffer of the third RAM 32 by means of the second transfer circuit 33; and third waveform sample data are processed by the DSP 35. Based on control data given from the CPU 10, the mixer 34 performs mixing operations on the aforementioned waveform sample data. Then, mixed data are delivered to the R buffer of the third RAM 32 by means of the second transfer circuit 33, or they are delivered to the DSP 35 or the D/A converter 37.

The DSP 35 performs several kinds of processes such as effect imparting processes and interpolation calculations on the waveform sample data of sixteen channels which are input thereto from the mixer 34. Then, results of the processes, i.e., resultant waveform sample data of sixteen channels are output to the mixer 34. Incidentally, the DSP 35 is designed as a multiprogram DSP that is capable of performing multiple kinds of signal processes such as the interpolation calculations and processes to impart several kinds of effects within one DAC cycle.

The A/D converter 36 performs sampling operations using the predetermined sampling rate (or DAC cycle, which is 44.1 kHz, for example) on audio signals (such as voice signals or musical tone signals) input from the microphone 28. Thus, the A/D converter 36 converts the audio signals to waveform sample data, which are forwarded to the mixer 34. The mixer 34 is designed to input and output waveform samples of four channels.

The DIA converter 37 converts waveform sample data of four channels, output from the mixer 34, to analog signals, which are then output to the sound system 29.

The mixer 34 inputs waveform sample data (or waveform data) of thirty-six channels in total every sampling period. That is, the mixer 34 inputs the waveform sample data of sixteen channels from the second transfer circuit 33, waveform sample data of sixteen channels from the multiprogram DSP and waveform sample data of four channels from the A/D converter 36 respectively. The mixer 34 has a capability to perform twenty types of mixing processes in total on the basis of level data, which are set independently for each of input/output events contained in the control data. Then, results of the mixing processes are output as waveform data of twenty-four channels in total. That is, the mixer 34 outputs waveform data of four channels to the second transfer circuit 33, waveform data of sixteen channels to the multiprogram DSP and waveform data of four channels to the D/A converter 37 respectively.

Using the aforementioned level data, it is possible to arbitrarily set a manner of connections to be established among the second transfer circuit 33, multiprogram DSP 35, A/D converter 36 and D/A converter 37. For example, in the case where the system records waveform data input from the "external" microphone 28 on the PC buffer(s), the sound input/output board 30 operates as follows:

The mixer 34 inputs waveform data from the A/D converter 36 every DAC cycle. Herein, the mixer 34 performs tone-volume control on the waveform data to transfer them to the multiprogram DSP 35. The multiprogram DSP 35 performs equalization process and compression process on them to produce processed waveform data, which are then subjected to tone-volume control in the mixer 34. Thereafter, the resultant waveform data are stored in a send-out register (not shown) provided inside of the mixer 34 to send out them to the second transfer circuit 33.

Incidentally, the aforementioned connections at a record mode can be set independently for each of four channels used for the record.

In the case where the system plays back waveform data of the PC buffer(s), the sound input/output board 30 operates as follows:

The second transfer circuit 33 outputs waveform data to an input register (not shown) provided inside of the mixer 34 every DAC cycle. Herein, the mixer 34 performs tone-volume control on the waveform data so as to send them to the multiprogram DSP 35. The multiprogram DSP 35 performs effect processes to impart effects such as chorus effects and reverberation effects to the waveform data. Then, the processed waveform data are subjected to tone-volume control in the mixer 34. Thereafter, the resultant waveform data are output to the D/A converter 37.

Incidentally, the connections at a playback mode can be set independently for each of sixteen channels used for the playback.

Further, the connections are be set arbitrarily to cope with the other cases. For example, the connections are set such that the mixer sends waveform data input from the A/D converter 36 to the multiprogram DSP 35, which in turn imparts effects to the waveform data to output them to the D/A converter 37. Or, the connections are set such that the multiprogram DSP 35 performs processes such as equalization processes on waveform data of the PC buffer played back by the playback channel, then, the record channel stores the processed waveform data in another PC buffer of another area.

Incidentally, the foregoing circuit components such as the mixer 34, DSP 35 and D/A converter 37, which perform processing in response to the sampling period, will be called digital audio circuits. Waveform data input to those digital audio circuits are converted to analog waveforms at last, which are then converted to sounds by speakers and the like.

Next, a counter (CNT) 38 is configured as a 32-bit counter, for example, which counts a number of pulses having a frequency of 44.1 kHz that corresponds to the aforementioned DAC cycle. Thus, the counter 38 uses the DAC cycles as units of counting to produce time data. A timing generator 39 controls operation of the first transfer circuit 31 or operation of the second transfer circuit 33 on the basis of comparison result between the time data output from the counter 38 and various kinds of designated time data stored in a register 40, content of which will be described later.

The aforementioned CPU 10 sets a variety of control data and variables, which are required for a variety of controls made on the first transfer circuit 31, second transfer circuit 33, counter 38, timing generator 39, DSP 35, A/D converter 36, D/A converter 37 and the like. Those control data and variables are set to the register 40. Incidentally, details of the data set to the register will be described later.

At a waveform playback mode, waveform sample data of respective channels stored in the PC buffers on the first RAM 12 are sequentially transferred to the P buffer of the third RAM 32, provided in the sound input/output board 30, under control of the first transfer circuit 31. Herein, data transfer is made using units of thirty-two samples. Under control of the second transfer circuit 33, one waveform sample data for each (tonegeneration) channel is forwarded to the D/A converter 37 via the mixer 34 (and the multiprogram DSP 35) every DAC cycle. Thus, the sound system 29 outputs the corresponding audio signals. At a waveform record mode, the A/D converter 36 converts audio signals input from the microphone 28 to waveform sample data, which are forwarded to the mixer 34. Then, the mixer 34 outputs the waveform sample data, which are stored in the R buffer of the third RAM 32 under control of the second transfer circuit 33. The waveform sample data once stored in the R buffer of the third RAM 32 are transferred to the PC buffer of the first RAM 12 under control of the first transfer circuit 31. Herein, data transfer is made using units of thirty-two samples.

Figure 3A:
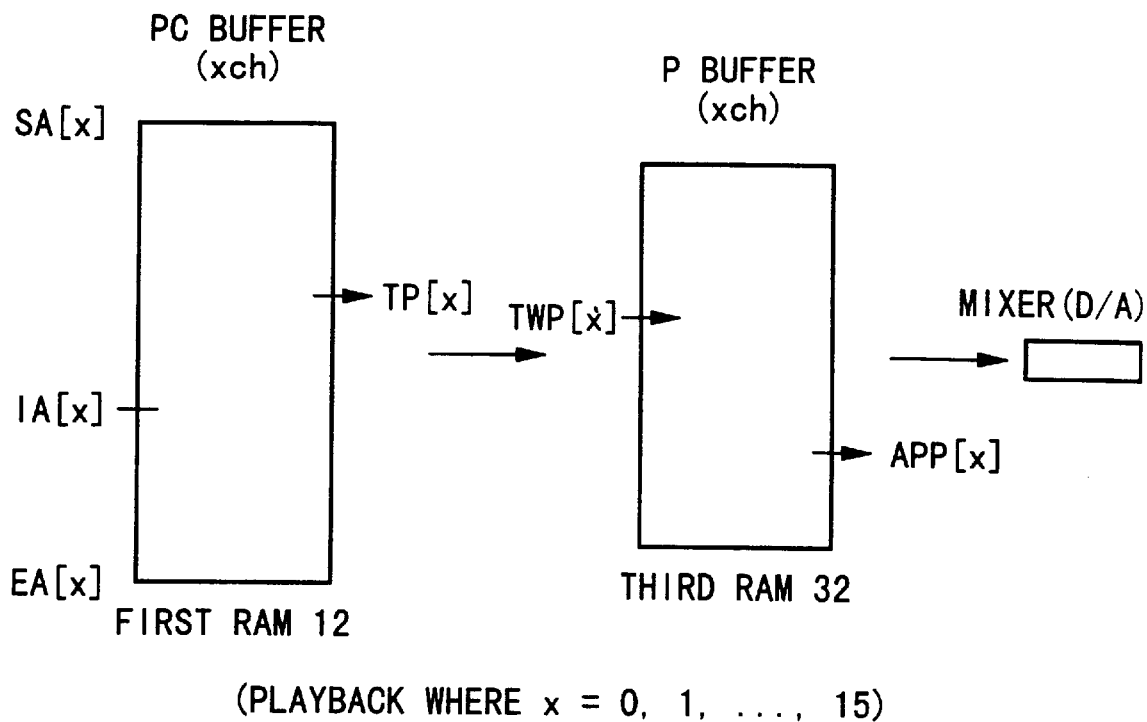
FIG. 3A shows a transfer flow of data at a playback mode.
Figure 3B:
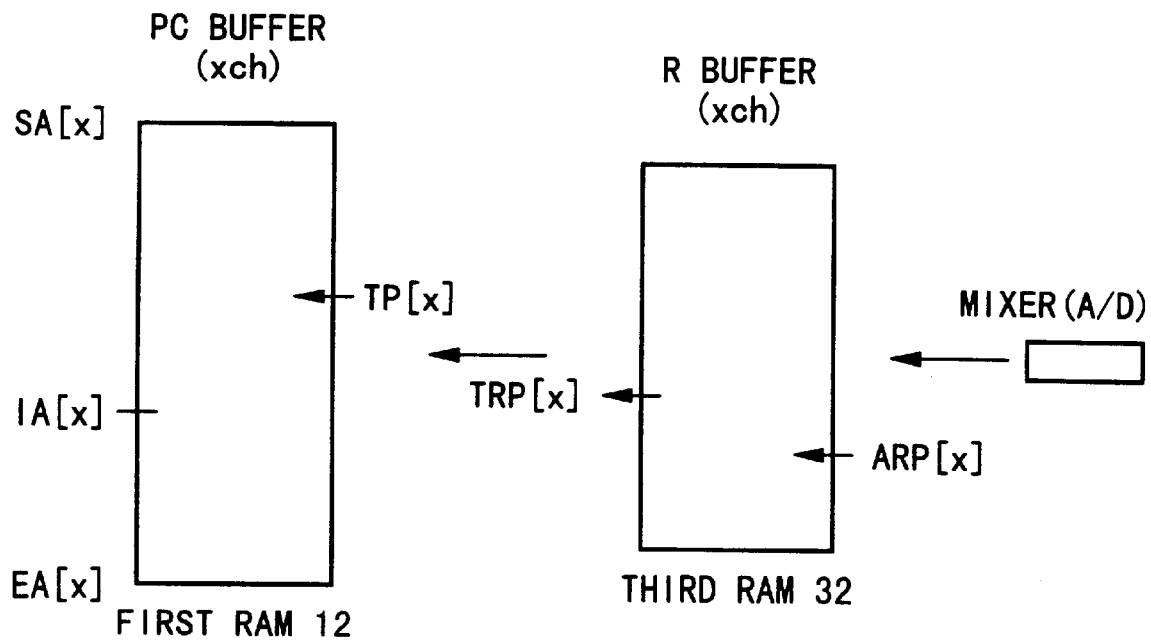
FIG. 3B shows a transfer flow of data at a record mode.

Next, details of the above operations will be described with reference to FIG. 3A and FIG. 3B, which show manners of transfer of waveform sample data between the PC buffer of the first RAM 12, the P buffer or R buffer of the third RAM 32, and the mixer 34. Specifically, FIG. 3A shows a transfer flow of data at a playback mode while FIG. 3B shows a transfer flow of data at a record mode. As described before, the present embodiment uses sixteen channels for the playback and four channels for the record. Namely, there are provided channel 0 to channel 15 as playback channels and channel 16 to channel 19 as record channels. On the third RAM 32, the P buffer and R buffer are provided independently of each other in response to the playback channel and record channel respectively. Each of those buffers is used as a circulative one such as a ring buffer.

FIG. 3A shows a transfer flow of data in playback for the channel 0 to channel 15. For convenience' sake, FIG. 3A shows a transfer flow of the data with respect to only one channel, which is denoted by "x" (or "x ch"). As shown in FIG. 3A, an area of the PC buffer which is provided on the first RAM 12 with regard to the channel x (where x=0, 1, . . . , 15) is defined by a start address SA[x] and an end address EA[x]. In addition, a reference symbol "TP[x]" designates a transfer pointer designating a read position for the above PC buffer area.

The sound input/output board 30 divides one DAC cycle to two portions, namely, first half duration and second half duration. In the first half duration of the DAC cycle, it makes a decision as to whether an operation to read waveform sample data from the PC buffer is required or not. If such an operation is required, the sound input/output board 30 issues a bus use request for use of the PCI bus 20 so as to send it to the bus arbiter. When securing a bus use right, it accesses the first RAM 12 to read data of consecutive thirty-two words from the address designated by the transfer pointer TP[x], so that the read data are subjected to burst transfer to the P buffer on the third RAM 32. At this time, the transfer pointer TP[x] is increased by sixteen addresses (i.e., thirty-two words) every one bus transaction. In addition, the PC buffer is accessed at a 32-bit address boundary. According to the burst transfer, the address is once transmitted onto the data bus, then, multiple data are continuously transferred using the data bus. So, in the burst transfer, it is unnecessary to designate the address with respect to each data. Therefore, it is possible to collectively transfer the multiple data of multiple addresses at a high speed from the designated address position on the memory. Suppose a case that data of thirty-two samples are subjected to burst transfer in one DAC cycle under the condition where the operating clock frequency of the PCI bus is 33 MHz. In that case, the system uses only 0.1% or so of the transfer capability of the bus. On the other hand, if the data of thirty-two samples are transferred without effecting the burst transfer, it is necessary to provide a large amount of transfer time, which is approximately four times or less longer than the transfer time required in the aforementioned burst transfer.

The present embodiment is designed such that an interrupt request address IA[x] can be set at some place between the start address SA[x] and the end address EA[x]. So, when the transfer pointer TP[x] reaches the interrupt request address IA[x], the system issues an interrupt request with respect to the CPU 10.

Therefore, by providing the setting that the interrupt request address IA[x] coincides with the end address EA[x], the CPU 10 is capable of detecting completion of transfer of the data of the PC buffer by detecting occurrence of an interrupt. At that time, it is possible to release the PC buffer and to use it for playback of other waveform data on the first RAM 12. Or, by making the setting of "TP[x]=SA[x]", it is possible to perform the repetitive playback of the waveform data stored in the PC buffer.

If the system employs the following method, it is possible to sequentially read a large amount of waveform data (e.g., several hundreds of kilo words to several tens of Mega words) and to directly play back them by using a small capacity (e.g., four kilo words to sixty-four kilo words) for the PC buffer with respect to one playback channel "x". That is, the following method enables the system to perform sequential reading operations and direct playback on the large amount of waveform data, which are stored in the external storage device such as the hard-disk drive 23 and CD-ROM drive 24, by using only a small storage capacity for the PC buffer with respect to one playback channel x.

At first, when a playback instruction is given with respect to one waveform data stored in the external storage device, the designated waveform data, which is a top part in playback of the waveform data, is transferred to the PC buffer [x]. Then, the interrupt request address IA[x] is set at an intermediate value between the start address SA[x] and the end address EA[x], so that the system starts playback of the PC buffer [x]. Thereafter, when the transfer pointer TP[x] reaches the interrupt request address IA[x] so that an interrupt occurs, the CPU 10 makes the setting of "IA[x]=EA[x]" so as to read next waveform data from the external storage device. The read waveform data are stored only in a first half of a full storage range of the PC buffer [x] which starts from the start address SA[x]. Thereafter, when TP[x] reaches IA[x] so that an interrupt occurs, the CPU 10 sets the aforementioned intermediate value to the transfer pointer TP[x] which is identical to SA[x] and IA[x] so as to read further waveform data from the external storage device. The read waveform data are stored in a second half of the full storage range of the PC buffer [x]. Thereafter, the system repeats two interrupt processes alternatively, i.e., the interrupt process caused at IA[x] that is set at the intermediate value and the interrupt process caused at IA[x] that is set at EA[x]. Thus, the system completely performs playback of the designated waveform data of the external storage device.

Incidentally, the CPU 10 is capable of performing data transfer of the waveform data whose amount corresponds to a half of the storage capacity of the PC buffer [x] by "DMAC" (i.e., Direct Memory Access Controller), which is built in the CPU 10. In addition, it is possible to employ burst transfer for the above data transfer.

As described above, the waveform sample data of thirty-two words are read from the PC buffer whose read address is designated by the transfer pointer TP[x] on the first RAM 12 and are subjected to burst transfer to the third RAM 32. The read waveform sample data are sequentially written into the P buffer of channel x from its address designated by a transfer write pointer TWP[x]. As described before, the P buffer has a storage size of 1k word per each channel. The transfer write pointer TWP[x] progresses the value thereof by thirty-two addresses every burst transfer operation.

The reading of the data of the P buffer is executed in the foregoing first half duration of the DAC cycle by the second transfer circuit 33. Herein, the second transfer circuit 33 reads one waveform sample data, corresponding to one sample, from an address of the P buffer designated by an audio play (or playback) pointer APP [x] every one DAC cycle, so that the read waveform sample data are transferred to the mixer 34. Incidentally, read start/end timings in reading of the data from the P buffer are controlled by the timing generator 39.

FIG. 3B shows a transfer flow of data for record channels. As described before, audio signals input from the microphone 28 are converted to digital audio data by the A/D converter 36, so that the audio data are subjected to prescribed signal processing by the DSP 35 according to needs and are then forwarded to the mixer 34. The second transfer circuit 33 receives waveform sample data, which are output from the mixer 34 every DAC cycle. In the first half duration of the DAC cycle, the second transfer circuit 33 writes the waveform sample data to an address of the R buffer of record channel x (where x=16, . . . , 19), which is designated by an audio record pointer ARP[x] on the third RAM 32. The system adds an increment to the audio record pointer ARP [x] every DAC cycle. Like the aforementioned P buffer, size of the R buffer corresponds to 1k words per each channel.

When the predetermined amount of waveform sample data are written into the R buffer of the third RAM 32, the first transfer circuit 31 acts as a bus master in the second half duration of the DAC cycle. Thus, the first transfer circuit 31 uses the burst transfer to write the waveform sample data to the PC buffer of the first RAM 12 by units of thirty-two words. In this case, the waveform sample data of thirty-two words, whose top address corresponds to a transfer read pointer TRP[x], are sequentially read from the R buffer and are sequentially written into the PC buffer of the first RAM 12 from its address designated by the transfer pointer TP[x]. The transfer pointer TP[x] is increased by sixteen addresses (i.e., thirty-two words) every one bus transaction.

Like the aforementioned playback mode (see FIG. 3A), the record mode of FIG. 3B sets the interrupt request address IA[x]. Using the interrupt request address IA[x], it is possible to sequentially release the PC buffers, each of which completes record. Or, it is possible to record a large amount of input waveform data on the hard disk of the hard-disk drive and the like.

As described heretofore, the present embodiment is designed such that the sound input/output board 30 which works as the waveform playback circuit is connected to the PCI bus 20 having a burst transfer function. Herein, when the system requires waveform samples to be read from the PC buffer, the first transfer circuit 31 secures a bus use right of the PCI bus 20, so that the waveform samples are subjected to burst transfer to the buffer memory of the corresponding channel on the sound input/output board 30 by units of thirty-two samples. Therefore, it is possible to avoid reduction of the operational efficiency of the system as a whole due to transfer of the waveform data. In addition, it is possible to simultaneously play back the waveform data of multiple channels in a stable manner.

Next, operations of the waveform record/playback system will be described in detail with reference to flowcharts.

Figure 4:
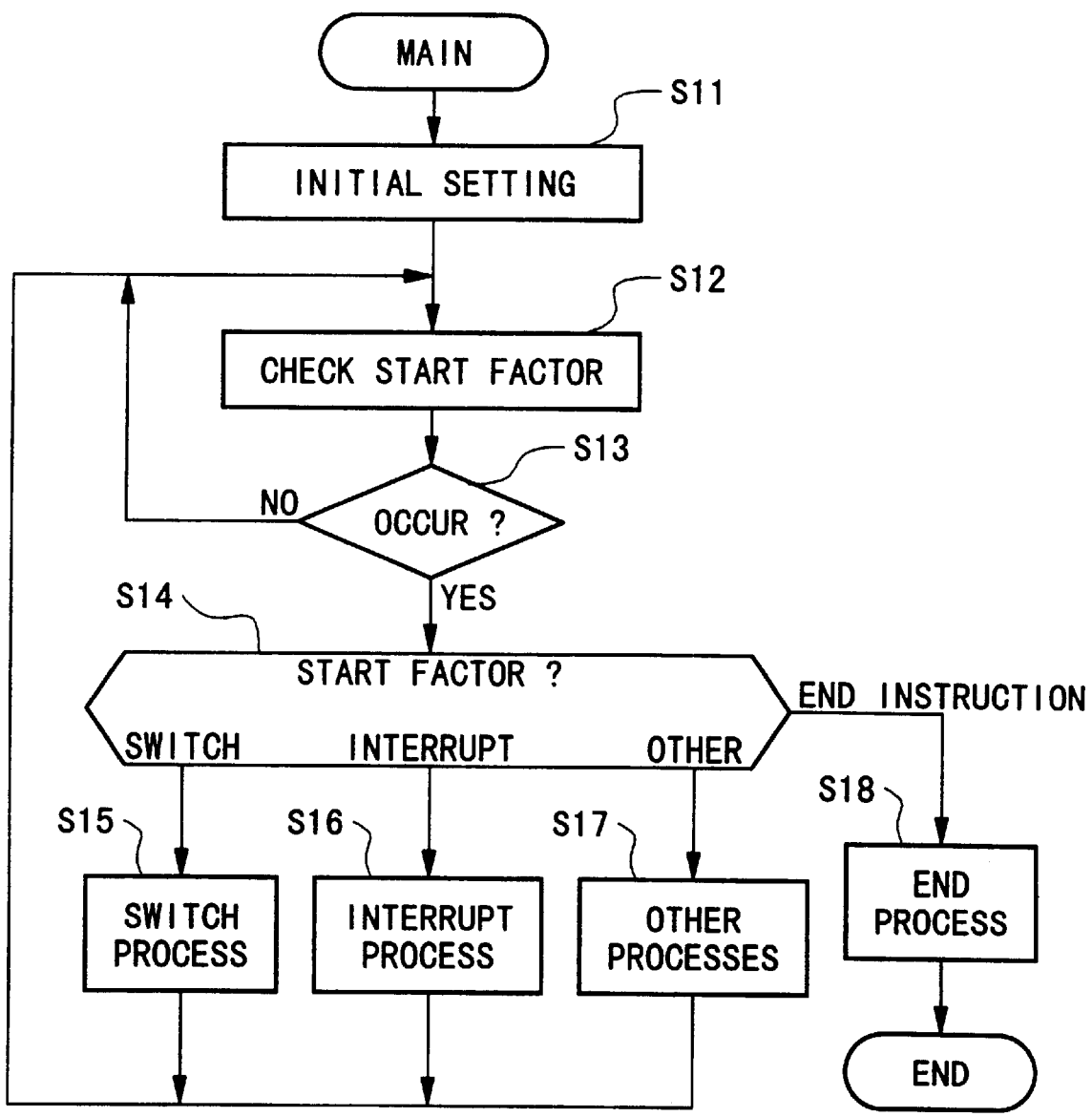
FIG. 4 is a flowchart showing a main routine of a waveform record/playback system in accordance with the embodiment of the invention.

FIG. 4 is a flowchart showing operations of a main routine which is executed by the CPU 10.

At first, the CPU 10 proceeds to step S11 to execute initial setting, wherein it secures areas and it performs initialization with respect to constants and flags. Next, the CPU 10 waits for occurrence of a start factor in steps S12 and S13. At the occurrence of the start factor, the CPU 10 transfers control to step S14, wherein it discriminates a type of the start factor that presently occurs.

If the start factor corresponds to a switch operation of a switch or a click of a mouse (not shown) which is made at a prescribed area on a GUI screen (where "GUI" is an abbreviation for "Graphical User Interface"), the CPU 10 transfers control to step S15 to perform a process corresponding to the switch and the like which is presently operated. If the switch operation is made with regard to waveform playback, a waveform playback process is activated, which will be described later.

If the start factor corresponds to an interrupt, the CPU 10 transfers control to step S16, wherein it performs an interrupt process corresponding to such an interrupt. Details of the interrupt process will be described later.

If the start factor corresponds to other processes which do not correspond to the switch operation and interrupt as well as an end instruction, the CPU 10 transfers control to step S17, wherein it performs the other processes corresponding to the start factor.

If the start factor corresponds to the end instruction, the CPU 10 transfers control to step S18, wherein it executes an end process to release memory areas and the like.

Next, a description will be given with respect to a waveform record/playback method to be performed in accordance with the present embodiment of the invention. Before specifically describing it, a brief description will be given with respect to flags and constants which are stored in the register 40 shown in FIG. 2.

A reference symbol "RF" designates a run flag. When "1" is set to the run flag RF, the counter 38 starts counting. When RF=0, the counter 38 stops counting.

It is described before that SA[x] designates the start address (or top address) of the PC buffer of channel x; EA[x] designates the end address (or last address) of the PC buffer of channel x; IA[x] designates the interrupt request address of the PC buffer of channel x; and TP[x] designates the transfer pointer for designating a read position (or read address) of the PC buffer of channel x.

Next, a reference symbol "SUS[x]" designates a suspend flag that data transfer of channel x made by the first transfer circuit 31 is temporarily suspended.

A reference symbol "PSC[x]" designates a playback start count value for channel x that represents a playback start time, which is measured using units of DAC cycles. "PEC[x]" designates a playback end count value for channel x that represents a playback end time, which is measured using units of DAC cycles. "TWP[x]" designates a transfer write pointer designating a write position of the P buffer of channel x. "TWF[x]" designates a transfer write flag designating start or end of transfer of data which are transferred from the PC buffer to the P buffer with respect to channel x. "APP[x]" designates an audio playback pointer designating a read position of the P buffer of channel x. "APF[x]" designates an audio playback flag designating start or end of waveform playback with respect to channel x.

Further, a reference symbol "RSC[x]" designates a record start count value designating a record start time, which is measured using units of DAC cycles with respect to channel x. "REC[x]" designates a record end count value designating a record end time, which is measured using units of DAC cycles with respect to channel x. "TRP[x]" designates a transfer read pointer designating a read position of the R buffer of channel x. "TRF[x]" designates a transfer read flag designating start or end of transfer of data, which are transferred from the R buffer to the PC buffer with respect to channel x. "ARP[x]" designates an audio record pointer for the R buffer of channel x. "ARF[x]" designates an audio record flag designating start or end of record of channel x. Furthermore, a reference symbol "RPC" designates a record pre-count value designating a number of previous samples, which exist prior to the present sample and from which recording is started in case of pre-trigger recording. In other words, RPC corresponds to data defining a number of previous samples from which data transfer is started on the basis of a value of ARP[x] which stands in case of TRF[x]=1. Namely, at the timing that "1" is set to TRF[x], a value of TRP[x] which is calculated by subtraction of "ARP[x]–RPC" is used as a transfer start address by which the first transfer circuit 31 starts data transfer to the PC buffer.

In order to perform recording, a human operator performs operation for record preparation at first. Then, the human operator manipulates the system to start the recording. In response to the operation for the record preparation, the CPU 10 sets "1" to the audio record flag ARF[x]. Thereafter, the CPU 10 sets "1" to TRF[x] in response to an instruction to start recording. In response to the above setting of ARF[x], the second transfer circuit 33 starts to write waveform data, output from the mixer 34, to the R buffer of the third RAM 32. Then, in response to the setting of TRF[x], the first transfer circuit 31 starts to transfer the waveform data of the R buffer to the PC buffer of the first RAM 12. An operation to write input waveform data into the R buffer is performed prior to the timing of the setting that "1" is set to TRF[x]. So, the aforementioned transfer start address is used to enable transfer of the waveform data to the PC buffer from a number of previous samples, which is designated by RPC and which exist prior to the present sample corresponding to the timing to instruct start of the recording.

According to the present embodiment described above, it is possible to start transfer of the waveform data from the R buffer to the PC buffer at the timing arbitrarily set. Moreover, the input waveform data are merely written into the R buffer until issuance of the record start instruction. So, there occurs no load imparted to the PCI bus under a standby state to wait for the record start instruction. As described above, the present embodiment is designed such that the human operator makes the record start instruction. Instead, it is possible to modify the present embodiment in such a way that the CPU 10 makes a record start instruction in response to level of the input waveform data.

The waveform reproduction method employed in the waveform record/playback system is designed to cope with various kinds of cases for playback, as follows:

(1) First case where playback is performed with respect to waveform sample data stored in the first RAM 12.

(2) Second case, corresponding to sequence playback, where waveform playback is performed based on sequence data describing times to play back waveform sample data with respect to each channel.

(3) Third case where playback is performed directly on waveforms recorded on the aforementioned hard disk (s).

First, a description will be given with respect to the first case where waveform sample data (or WAVE data) stored in the first RAM 12 are played back.

Figure 5A:
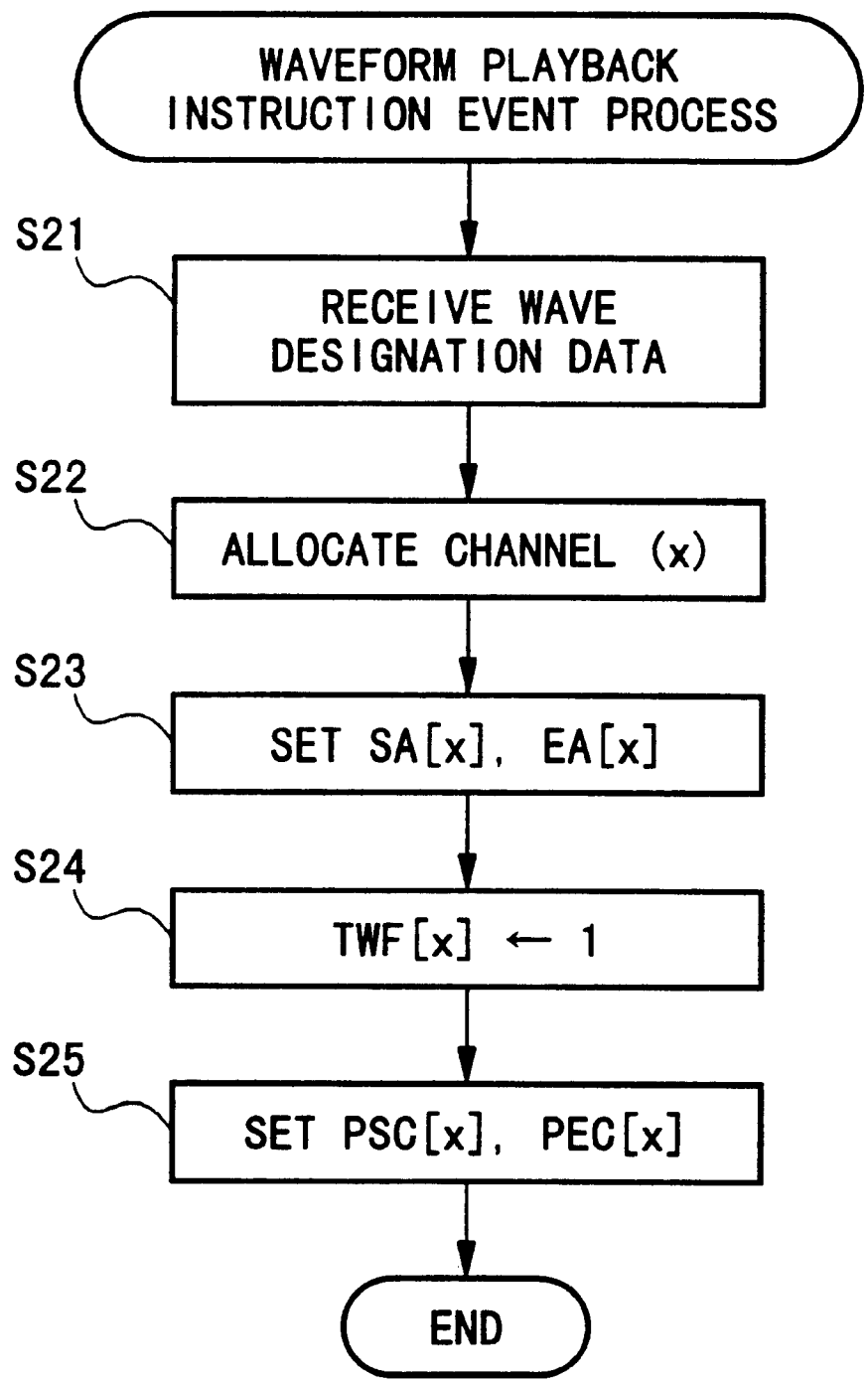
FIG. 5A is a flowchart showing a waveform playback instruction event process that is executed in response to a waveform playback instruction.

FIG. 5A is a flowchart for explaining operations that are executed by the CPU 10 when a waveform playback instruction is made to play back the WAVE data in the first case. The whole processing of the flowchart of FIG. 5A is contained in the aforementioned switch process of step S15 shown in FIG. 4.

A human operator operates a switch to designate waveform playback or clicks a mouse to designate an area of button switch on the GUI screen, so that he or she enters a waveform playback command (or instruction). In response to such an instruction, the CPU 10 starts the waveform playback instruction event process of FIG. 5A. In step S21, the CPU 10 receives WAVE designation data designating waveform data which should be played back and which are stored in the first RAM 12, wherein the WAVE designation data are contained in the waveform playback instruction.

In next step S22, the CPU 10 performs allocation of tone-generation channels in response to the WAVE data that the CPU 10 is instructed to play back simultaneously. In this case, the playback channels may contain vacant channels which are not presently used for tone generation. That is, the CPU 10 acknowledges the vacant channels, in which "0" is set to both of the transfer write flag (TWF) and audio playback flag (APF), within the playback channels which range between channel 0 to channel 15. Thus, the CPU 10 designates a certain channel as a new tone-generation channel x, which is newly used for tone generation, from the vacant channels. If all of the playback channels correspond to tone-generation channels so that they do not contain a vacant channel in which "0" is set to both of TWF and APF, the CPU 10 searches through the sixteen playback channels to find out a channel whose tone-generation du ration is the shortest or a channel whose tone volume is the smallest. Thus, the CPU 10 mutes sound of such a channel to use it as a new tone-generation channel x.

The aforementioned WAVE designation data contain a top address and a last address which define a certain area of the PC buffer with regard to the corresponding WAVE data. In step S23, those addresses are used as a start address SA[x] and an end address EA[x] for the tone-generation channel x, which are set to the register 40.

In step S24, "1" is set to the transfer write flag TWF[x] stored in the register 40 with regard to the tone-generation channel x. At this time, the transfer write pointer [x] and audio playback pointer APP[x] of the channel x are initialized as well. Incidentally, the setting of "1" to TWF[x] enables the first transfer circuit 31 to start transfer (or pre-load) of the designated WAVE data to the P buffer of the third RAM 32, which will be described later.

With regard to the tone-generation channel x, the playback start count value PSC[x] represents a playback start time which is measured using units of DAC cycles while the playback end count value PEC[x] represents a playback end time which is measured using units of DAC cycles. In step S25, the aforementioned values PSC[x] and PEC[X] are set to the register 40. In order to immediately start playback, for example, the CPU 10 calculates a present time, measured using units of DAC cycles, based on present time data indicated by the timer 17, so that a value of the calculated present time is set to the playback start count value PSC[x]. If the aforementioned waveform playback instruction contains information representing a playback end time, its value is set to the playback end count value PEC[x]. If a series of the WAVE data are all played back, a number of the waveform samples included in the WAVE data is added to the playback start count value PSC[x] to produce a value which is set to the playback end count value PEC[x]. Incidentally, the aforementioned operations are made under the condition where the run flag RF is set at "1" (i.e., RF=1), so that the counter 38 progresses counting.

The above is the description regarding the processing that is executed by the CPU 10 in response to the waveform playback instruction. In that processing, SA[x], EA[x], PSC[x] and PEC[x] are set with respect to each of the allocated tone-generation channels, while "1" is set to the transfer write flag TWF[x] designating start of transfer of data which are transferred from the PC buffer to the P buffer. Actual playback process is performed by the first transfer circuit 31 and the second transfer circuit 33, operations of which will be described below.

Figure 5B:
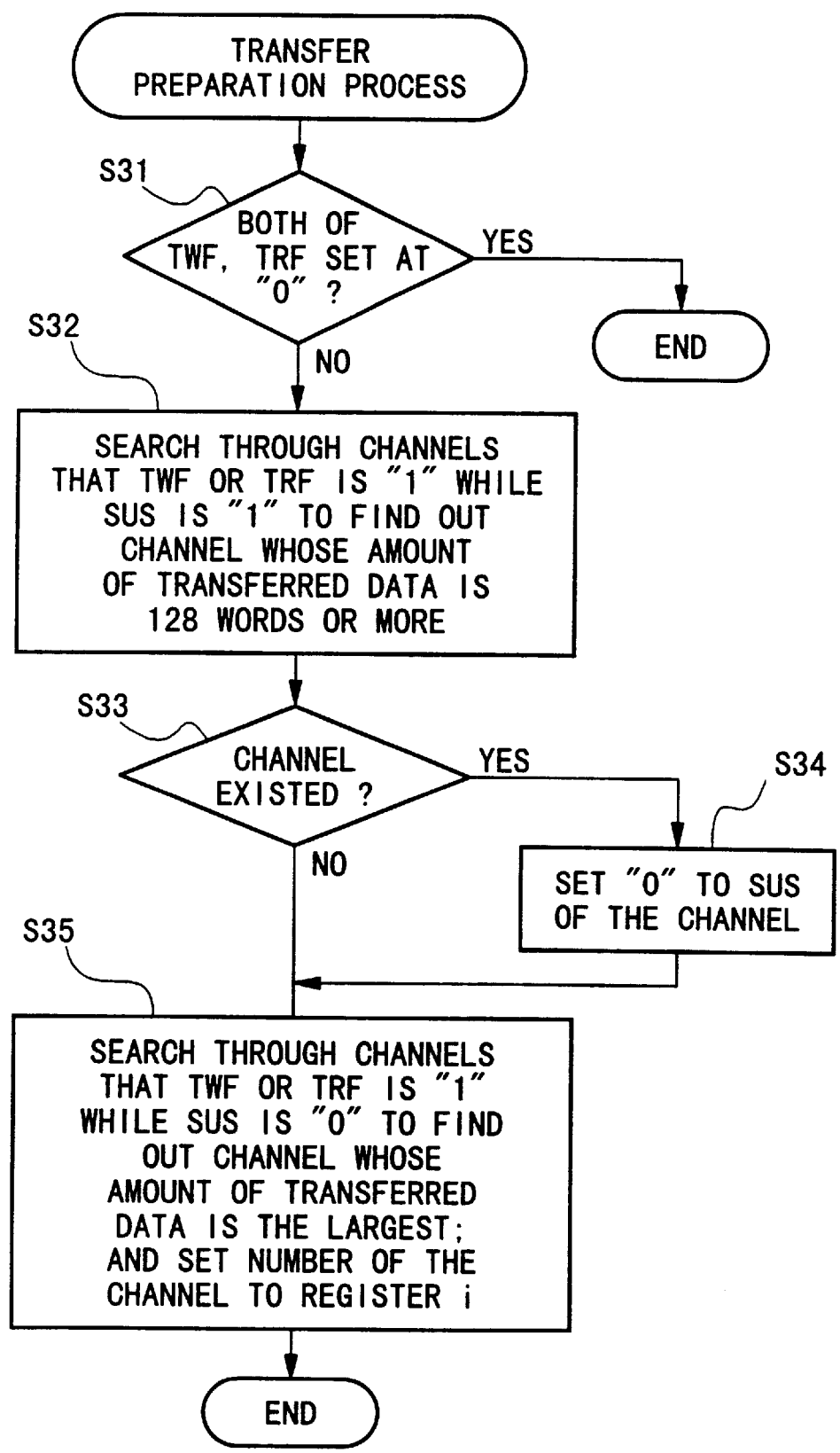
FIG. 5B is a flowchart showing a transfer preparation process which is performed by a first transfer circuit shown in FIG. 2.

FIG. 5B is a flowchart showing a transfer preparation process made by the first transfer circuit 31. This transfer preparation process is performed once in the first half duration within one DAC cycle.

In step S31, a decision is made as to whether "1" is set to the transfer write flag TWF[x] or the transfer read flag TRF[x]. If "1" is not set to both of the flags TWF[x] and TRF[x], in other words, when both of the flags TWF[x] and TRF[x] are set at "0" so that a decision of step S31 results in "YES", it can be said that data transfer is not instructed. So, the first transfer circuit 31 ends the transfer preparation process of FIG. 5B.

In contrast, if "1" is set to either the flag TWF[x] or the flag TRF[x], in other words, when there exist channels for which data transfer is instructed, the first transfer circuit 31 proceeds to step S32.

In step S32, the first transfer circuit 31 searches through the aforementioned channels in which "1" is set to either TWF[x] or TRF[x] to find out a channel in which "1" is set to a suspend flag SUS[x] and for which data of 128 words or more to be transferred are provided. Herein, the suspend flag SUS[x] is used to temporarily stop transfer of WAVE data of the corresponding channel for prevention of catch-up. This suspend flag SUS[x] is set at "1" in prescribed cases as follows:

(i) First case where the corresponding channel is the playback channel (or tone-generation channel) so that unused storage capacity of the P buffer to which the WAVE data are to be written becomes smaller than an amount of data (e.g., thirty-two words in the present embodiment) which are transferred by one burst transfer.

(ii) Second case where the corresponding channel is the record channel so that an amount of waveform samples stored in the R buffer becomes smaller than thirty-two words.

In short, when the suspend flag SUS[x] is set at "1", data transfer for the corresponding channel is temporarily stopped (or suspended).

When the first transfer circuit 31 finds out the channel in which the suspend flag SUS[x] is set at "1" and for which data of 128 words or more to be transferred are provided, it proceeds to step S34 via step S33. In step S34, the first transfer circuit 31 resets the suspend flag SUS[x] of the above channel to "0". Herein, the aforementioned expression of "data to be transferred" (or transferred data) matches with unused storage capacity of the P buffer when the channel is the tone-generation channel or an amount of waveform samples stored in the R buffer when the channel is the record channel.

Through the aforementioned steps S32 to S34, the first transfer circuit 31 performs the prescribed process that the suspend flag SUS[x] is reset to "0" to release a suspended state of data transfer with respect to the channels for which the data to be transferred are 128 words or more within the channels in which the suspend flag SUS[x] is set at "1".

Thereafter, the first transfer circuit 31 proceeds to step S35 that deals with channels in which the flag TWF[x] or TRF[X] is set at "1" while the suspend flag SUS[x] is set at "0". That is, in step S35, the first transfer circuit 31 searches through the above channels to find out a channel in which an amount of data to be transferred is the largest and to which a channel number of "x" is assigned. Such a channel number "x" is set to a register "i" that designates a number of a channel which is subjected to transfer process of the present cycle.

The aforementioned steps form the flowchart of FIG. 5B according to which the first transfer circuit 31 performs the transfer preparation process. That is, in the transfer preparation process which is performed in first half duration of the DAC cycle, a channel on which data transfer is made is determined so that a number of such a channel is set to the register i.

Incidentally, the aforementioned step S35 is designed to choose the channel in which an amount of data to be transferred is the largest as a transfer subject channel which is subjected to transfer process of the next cycle. However, it is possible to determine such a transfer subject channel in accordance with other methods. For example, it is possible to sequentially designate the channels in which either the flag TWF[x] or TRF[x] is set at "1" while the flag SUS[x] is set at "0" as the transfer subject channels, numbers of which are sequentially set to the register i. Or, it is possible to employ another method which is preferable in the case where the second transfer circuit 33 is equipped with an interpolation circuit as well as an address counter with respect to each channel so that the system is configured to enable simultaneous record/playback operations for waveform samples having different sampling rates. In that case, varying speeds of the transferred data differ in response to the sampling rates, so that the method is designed to determine the transfer subject channel(s) with reference to the transferred data.

Next, a description will be given with respect to a transfer process that is performed by the first transfer circuit 31 with reference to a flowchart shown in FIG. 5C. This transfer process is performed in second half duration of the DAC cycle.

In the transfer process, the first transfer circuit 31 firstly proceeds to step S41, wherein examination is made as to whether there exists a transfer subject channel or not. The above examination is made by making a decision as to whether data representing existence of the transfer subject channel is set to the register i or not. If no channel number is set to the register i, it can be said that no transfer subject channel exists. So, the first transfer circuit 31 ends the transfer process of FIG. 5C.

If the channel number is written into the register i in the aforementioned transfer preparation process, the decision of step S41 results in "NO", so that the first transfer circuit 31 proceeds to step S42, wherein it secures the PCI bus. That is, the first transfer circuit 31 requests the bus arbiter to provide a bus use right of the PCI bus 20. Then, it secures the bus use right.

After securing the bus use right of the PCI bus 20, the first transfer circuit 31 proceeds to step S43, wherein it performs transfer of WAVE data of thirty-two samples of channel "i", which corresponds to the channel number set to the register i. That is, the first transfer circuit 31 now acts as a bus master, so that if the channel i is the tone-generation channel, the first transfer circuit 31 accesses the PC buffer of the channel i on the first RAM 12 to read WAVE data of thirty-two samples from a storage position designated by the transfer pointer TP[i]. hen, the read WAVE data are transferred to the P buffer of the channel i on the third RAM 32 in accordance with a burst transfer mode and are sequentially written into a storage position designated by the transfer write ppointer TWP[i]. If the channel i is the record channel, the first transfer circuit 31 accesses the R buffer of the channel i on the third RAM 32 to read waveform data of thirty-two samples from a storage position designated by the transfer read pointer TRP[i]. Then, the read waveform data are transferred to the PC buffer of the channel i in accordance with the burst transfer mode and are sequentially written into a storage position designated by the transfer pointer TP[i].

In step S43, after the burst transfer, the first transfer circuit 31 progresses the transfer pointer TP[i], used in the burst transfer, by sixteen addresses which correspond to thirty-two samples. In addition, it progresses the transfer write pointer TWP[i] and the transfer read pointer TRP[i], used in the burst transfer, by thirty-two addresses. If the pointers TWP[i] and TRP[i] reach last addresses of the P buffer and R buffer respectively, the first transfer circuit 31 controls the pointers TWP[i] and TRP[i] to return to top addresses of the P buffer and R buffer respectively.

After completion of the data transfer, the first transfer circuit 31 proceeds to step S44 to release the PCI bus 20.

Next, the first transfer circuit 31 proceeds to step S45, wherein a decision is made as to whether an amount of transferred data for the channel i is below thirty-two samples or not. Namely, if the channel i is the tone-generation channel, a decision is made as to whether unused storage capacity of the P buffer is below thirty-two samples or not. If the channel i is the record channel, a decision is made as to whether an amount of samples stored in the R buffer is below thirty-two samples or not. If the decision of step S45 results in "YES", catch-up occurs in the data transfer of the next cycle. To prevent the catch-up, "1" is set to the suspend flag SUS[i] of the channel i so that data transfer for the channel i is suspended (see step S46).

The aforementioned operations are contents of the transfer process which is performed one time by the first transfer circuit 31.

Figure 5C:
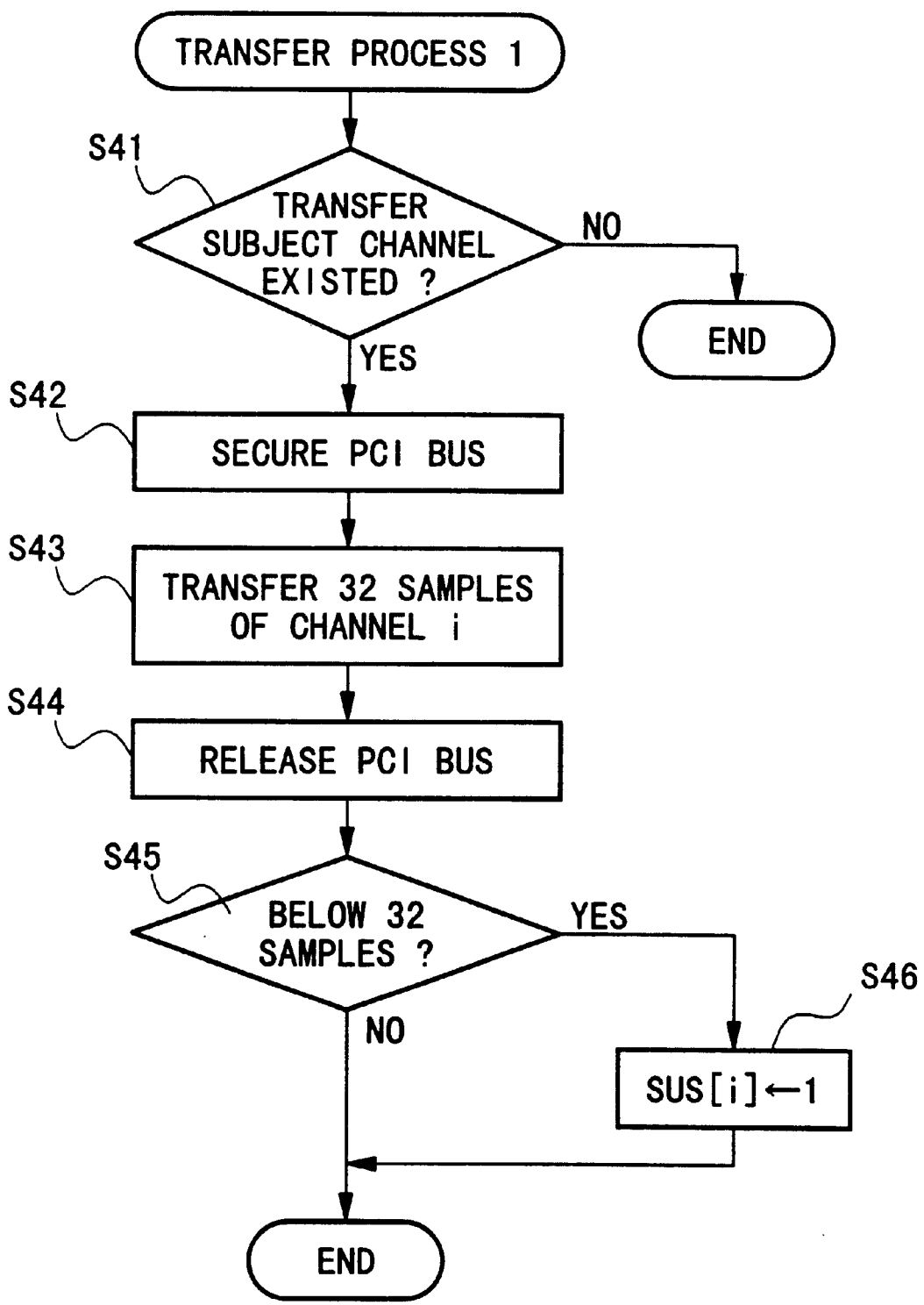
FIG. 5C is a flowchart showing a transfer process which is performed by the first transfer circuit.

That is, the first transfer circuit 31 performs the transfer preparation process of FIG. 5B and the transfer process of FIG. 5C one time within one DAC cycle. So, it performs transfer of WAVE data of thirty-two samples with respect to one channel in one DAC cycle. As for the tone generation channel, its WAVE data are sequentially stored in the P buffer of the third RAM 32 until the unused storage capacity of the P buffer becomes thirty-two samples or below. As for the record channel, waveform samples stored in the R buffer of the third RAM 32 are sequentially transferred to the PC buffer of the first RAM 12 until an amount of remained waveform samples in the R buffer becomes thirty-two samples or below.

As described above, in the data transfer made by the first transfer circuit 31, a number (x) of a single channel is only set to the register i in step S35 shown in FIG. 5B, then, data transfer for such a single channel is performed in step S43 shown in FIG. 5C. However, the present embodiment can be modified to cope with a number of channels. That is, the step S35 is modified to set multiple channels rather than a single channel. For example, it is possible to set "n" channels (e.g., n=5) maximally, which contain channels whose amounts of transferred data are the second largest, third largest, . . . in addition to the channel whose amount of transferred data are the largest. In that case, numbers of the "n" channels are respectively set to "n" registers designated by reference symbols of "i1" to "in" respectively. Thus, the step S43 is modified to enable collective data transfer with respect to the "n" channels maximally. If there exists a channel (or channels) whose data transfer delays so much, it is possible to register the number of the same channel with multiple registers within the "n" registers. In that case, it is possible to perform data transfer of sixty-four samples, ninety-six samples or so with respect to the same channel.

Next, a description will be given with respect to a transfer process performed by the second transfer circuit 33 with reference to a flowchart shown in FIG. 6A. Specifically, the transfer process of the second transfer circuit 33 works for the tone-generation such that WAVE data are transferred from the P buffer of the third RAM 32 to the mixer 34 shown in FIG. 2. In addition, it works for the record channel such that waveform data are transferred from the mixer 34 to the R buffer of the third RAM 32. The second transfer circuit 33 performs the aforementioned transfer process one time in first half duration of each DAC cycle.

First, the second transfer circuit 33 proceeds to step S51, wherein an initial value of "0" is set to a register j that stores a channel number. It is described before that the tone-generation channels range between channel 0 to channel 15 while the record channels range between channel 16 to channel 19. Therefore, the register j designates a tone-generation channel when the value thereof belongs to a range defined by an inequality of "$0 \leq j \leq 15$", while the register j designates a record channel when the value thereof belongs to a range defined by an inequality of "$16 \leq j \leq 19$".

In step S52, a decision is made as to whether "1" is set to the audio playback flag APF[j] or not, wherein the audio playback flag APF[j] is provided for the channel j designated by the register j to instruct start or end of waveform playback. With regard to the tone-generation channel x, the audio playback flag APF[x] is set at "1" at a tone-generation start time or "0" at a tone-generation end time in a timing generation process, content of which will be described later.

If "1" is set to the audio playback flag APF[j] corresponding to the tone-generation channel j, the second transfer circuit 33 proceeds to step S53. In step S53, the second transfer circuit 33 adds an increment of "1" to the audio playback pointer APP[j], which is provided for the P buffer of the third RAM 32 with respect to the tone-generation channel j. Thus, waveform sample data (or WAVE data) are read from an address of the P buffer designated by the audio playback pointer APP[j] and are then transferred to an input register provided inside of the mixer 34. Thereafter, the second transfer circuit 33 proceeds to step S54.

In contrast, when "0" is set to the audio playback flag APF[j], the second transfer circuit 33 proceeds directly to step S54 from step S52. Incidentally, when the address designated by the pointer APP[j] reaches the last storage position of the P buffer, the value of the APP[j] is restored to coincide with the top storage position of the P buffer.

In step S54, the value "j" is increased to "j+1". Thus, the second transfer circuit 33 repeats the aforementioned steps until the increased value of "j" becomes equal to "16" or above (see step S55).

Thus, when the aforementioned steps are completely performed up to channel 15, in other words, when the channel presently processed belongs to a range of the record channels, a decision of the step S55 results in "YES", so that the second transfer circuit 33 proceeds to step S56. In step S56, a decision is made as to whether the audio record flag ARF[j] is set at "1" or not, wherein the audio record flag ARF[j] instructs start or end of record of audio data with respect to the (present) record channel "j". Generally, the CPU 10 controls the audio record flag ARF[x] corresponding to the channel x such that "1" is set to the flag ARF[x] at the timing prior to the record start time, then, "0" is set to the flag ARF[x] at the record end time.

When the audio record flag ARF[j] presently corresponding to the "record" channel j is set at "1", the decision of step S56 results in "YES", so that the second transfer circuit 33 proceeds to step S57. In step S57, the second transfer circuit 33 adds an increment of "1" to the audio record pointer ARP[j] which is provided for the R buffer of the third RAM 32 with respect to the record channel j. In addition, the second transfer circuit 33 reads waveform sample data, which are given from the A/D converter 36 and are stored in an output register provided inside of the mixer 34. Thus, the waveform sample data are written into an address of the R buffer designated by the audio record pointer ARP[j]. Herein, when a value of the pointer ARP[j] progresses to coincide with the last storage position of the R buffer, the pointer ARP[j] is restored to coincide with the top storage position of the R buffer. Incidentally, the second transfer circuit 33 does nothing with respect to the record channel in which the audio record flag ARF[j] is set at "0".

In step S58, the value of "j" is increased to "j+1". Thus, the second transfer circuit 33 repeats the aforementioned steps S56 to S58 until the value "j" becomes equal to "19" (see step S59). Thereafter, the second transfer circuit 33 ends the transfer process in the present DAC cycle.

The aforementioned content of the transfer process of the second transfer circuit 33 can be summarized as follows:

Every DAC cycle, decisions are sequentially made with respect to all of the tone-generation channels (i.e., sixteen channels ranging between channel 0 and channel 15) as to whether a tone-generation start instruction is made or not with respect to each of them. As for the tone-generation channel on which the tone-generation start instruction is made, one waveform sample data is read and is transferred to the mixer 34. In addition, the second transfer circuit 33 searches through all of the record channels (i.e., four channels ranging between channel 16 and channel 19) to find out the record channel on which a record start instruction is made. With regard to such record channel, waveform sample data, which are produced by analog-to-digital conversion performed by the A/D converter 36, are transferred to the third RAM 32 via the mixer 34 and are written into the R buffer.

Next, a description will be given with respect to the timing generation process with reference to a flowchart shown in FIG. 6B. The timing generation process is provided to set or reset the audio playback flag APF[x] at the designated timing, or it is provided to set or reset the transfer record flag TRF[x] and audio record flag ARF[x] at the designated timing. This timing generation process is normally performed by the timing generator 39 shown in FIG. 2.

It is described before that the counter 38 is the 32-bit counter for counting a number of DAC cycles, which emerge in response to the frequency of 44.1 kHz in the present embodiment of the invention, for example. The counter 38 is capable of counting them or measuring time up to twenty-five hours or so. In the present embodiment, each of the start timing and end timing in waveform playback and waveform record is controlled using time which is measured using units of DAC cycles. Namely, the start time and end time in playback or record are designated by time data, which are measured using units of DAC cycles.

The timing generator 39 compares a counter value of the counter 38 with the playback start counter value PSC[x] designating the playback start time, the playback end counter value PEC[x] designating the playback end time, the record start counter value RSC[x] designating the record start time and the record end counter value REC[x] designating the record end time respectively. Herein, those count values are set by the CPU 10 and are measured using units of DAC cycles. Thus, the timing generator 39 performs a process to set or reset the corresponding audio playback flag [x] as well as a process to set or reset the corresponding transfer record flag TRF[x] and audio record flag ARF[x].

Figure 6A:
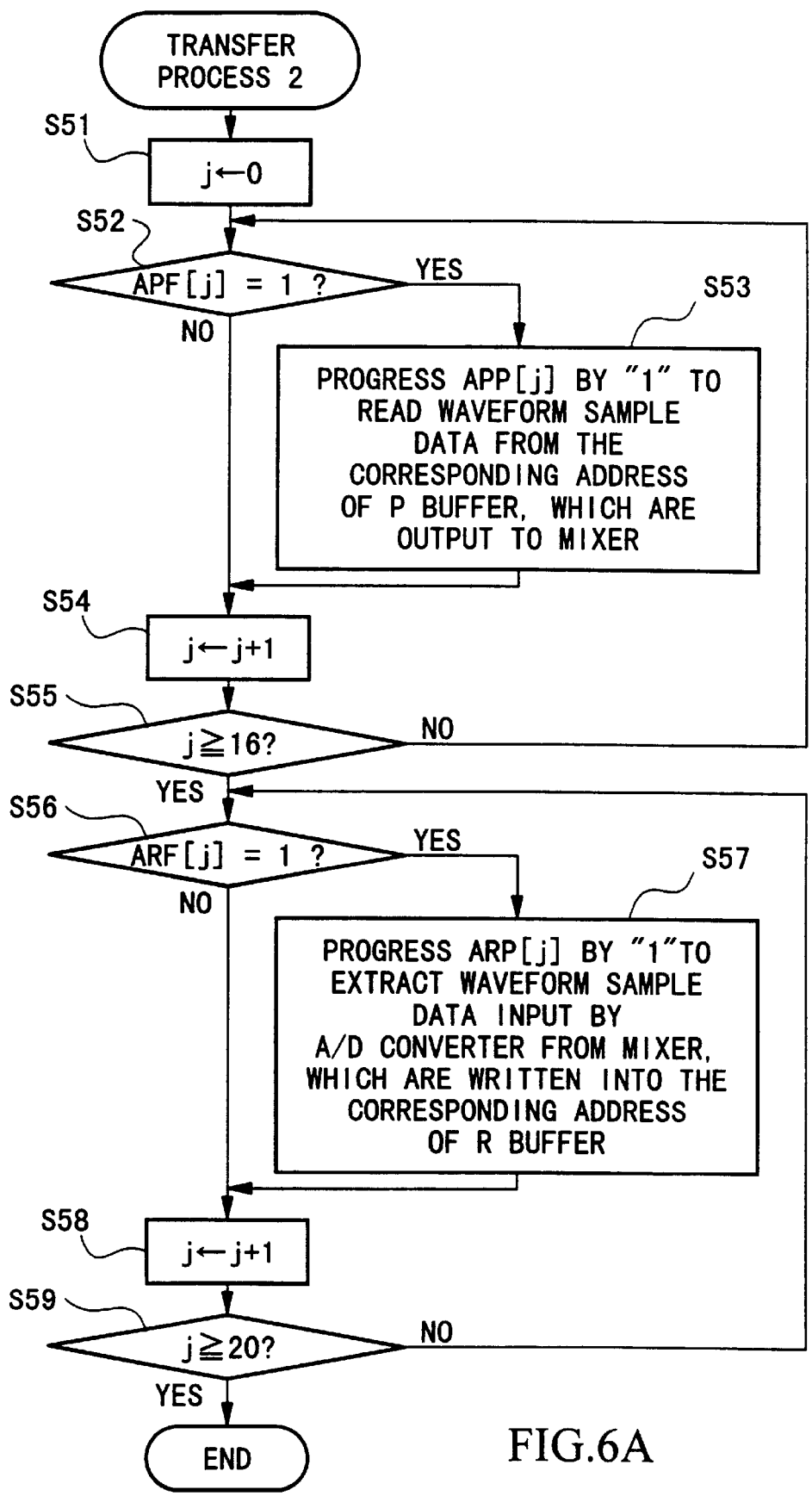
FIG. 6A is a flowchart showing a transfer process which is performed by a second transfer circuit.
Figure 6B:
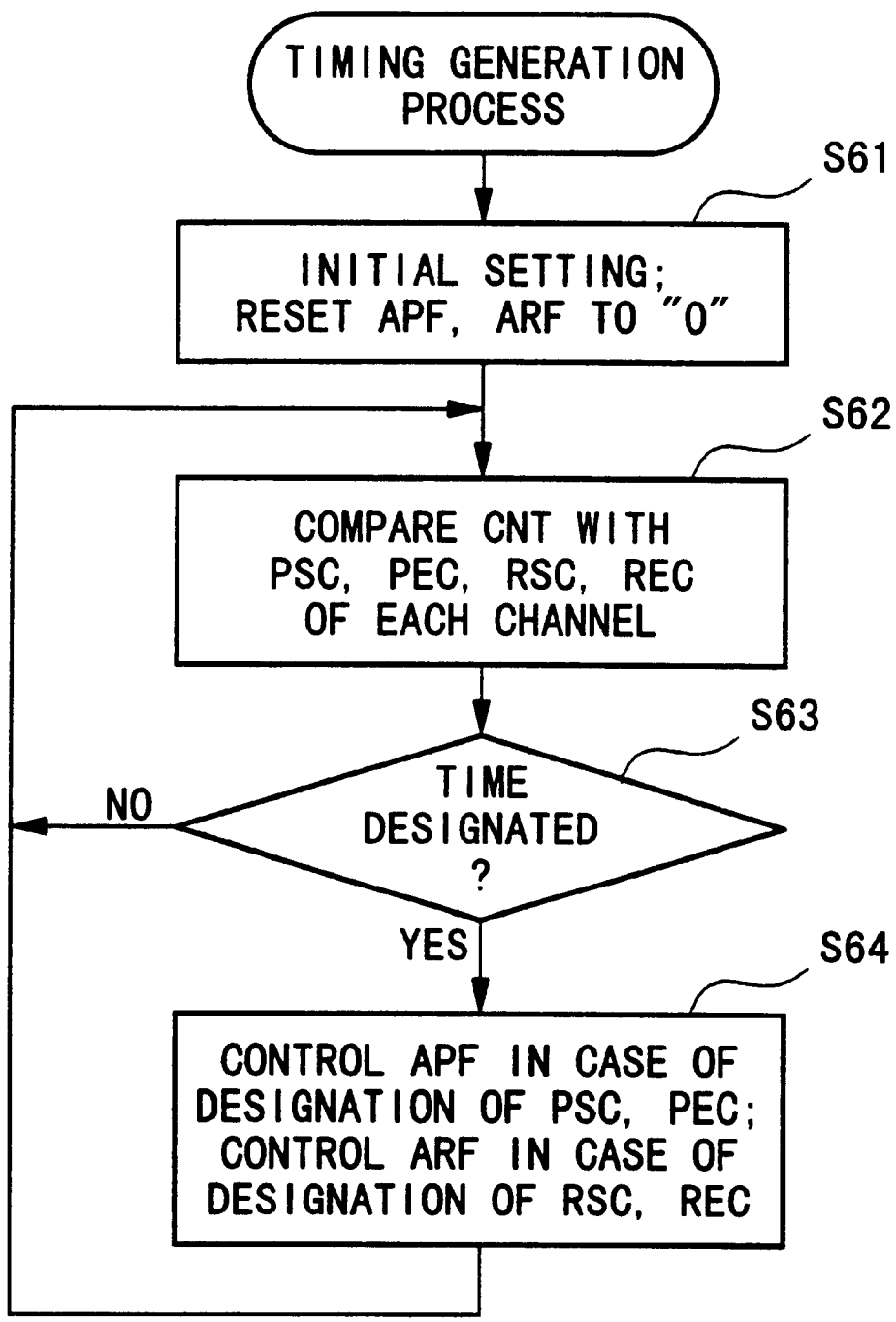
FIG. 6B is a flowchart showing a timing generation process which is performed by a timing generator shown in FIG. 2.

At an initial-setting mode, the timing generator 39 resets the audio playback flag APF[X] and audio record flag ARF[x] to "0" with respect to each of channels (see step S61 shown in FIG. 6B).

Then, the timing generator 39 proceeds to steps S62 and S63. Herein, the timing generator 39 compares the count value of the counter 38 with times designated by the playback start count value PSC[x] and playback end count value PEC[x] which are set to the register 40 with respect to each playback channel "x", or it compares the count value of the counter 38 with times designated by the record start count value RSC[x] and record end count value REC[X] which are set to the register with respect to each record channel "x". Then, the timing generator detects coincidence between the count value of the counter 39 and the designated times respectively.

When the timing generator detects coincidence between the count value of the counter 38 and any one of the times designated by PSC[x], PEC[x], RSC[x] and REC[x] with respect to certain channel "x", it proceeds to step S64. In step S64, the timing generator controls the audio playback flag APF[x] corresponding to the detected channel, or it controls the transfer record flag TRF[x] and audio record flag ARF[x] corresponding to the detected channel. Namely, if the count value of the counter 38 coincides with the playback start count value PSC[x], "1" is set to the audio playback flag APF[x]. If the count value coincides with the playback end count value PEC[x], the audio playback flag APF[x] is reset to "0". In addition, if the count value of the counter 38 coincides with the record start count value RSC[x], "1" is set to the transfer record flag TRF[x]. If the count value coincides with the record end count value REC[x], the audio record flag ARF[x] is reset to "0".

According to the timing generation process of FIG. 6B, the audio playback flag APF[x] designating playback of the certain channel "x" remains at "1" only in a period of time between the playback start time designated by the playback start count value PSC[x] and the playback end time designated by the playback end count value PEC[x]. In addition, the transfer record flag TRF[x] instructing data transfer for the certain channel "x" is set at "1" at the record start time designated by the record start count value RSC[x], then, the audio record flag ARF[x] instructing recording for the certain channel "x" is set at "0" at the record end time designated by the record end count value REC[x]. Thus, the transfer process of the second transfer circuit 33 works as shown in FIG. 6A in such a way that waveform sample data are sent to the mixer with respect to the certain tone-generation channel, or the third RAM 32 loads waveform sample data, produced by the analog-to-digital conversion, with respect to the certain record channel. Incidentally, the present embodiment can be modified such that the timing generator 39 issues an interrupt for the CPU 10 when detecting the times designated by PEC[x] and REC[x] respectively. Herein, in response to the interrupt corresponding to PEC[x], the CPU 10 releases the channel which ends the present playback operation to cope with a next playback operation. Or, in response to the interrupt corresponding to REC[x], the CPU 10 releases the channel which ends the present recording operation to cope with a next recording operation.

It is possible to summarize the present embodiment as follows:

The present embodiment is basically configured by a register to which the CPU sets timing data with respect to each channel, a counter for counting a number of timing pulses and a timing generator for generating a timing signal based on the count value of the counter and the timing data set in the register with respect to each channel. Herein, the present embodiment reads waveform data from a storage area of a buffer memory corresponding to the channel in response to the timing signal so as to play back the waveform data. Thus, it is possible to achieve an objective to enable simultaneous playback of multiple waveform data stored in the buffer memory accurately at the designated timings.

Next, operations of the first transfer circuit 31 and second transfer circuit 33 will be described with respect to the case where the CPU 10 performs the foregoing waveform playback instruction event process of FIG. 5A which is activated by an event of waveform playback instruction.

In the aforementioned step S24 shown in FIG. 5A, "1" is set to the transfer write flag TWF[x] with respect to the channel "x" used for playback of WAVE data. Thus, the first transfer circuit 31 proceeds to step S32 (see FIG. 5B) that "0" is set to the suspend flag SUS[x]. At a transfer start mode, the P buffer of the channel x is in a vacant state, so the channel x is defined as the channel whose amount of transferred data is large. Therefore, in the following step S35, the channel number representing the channel x is set to the register i. Under such a state, the step S43 (see FIG. 5C) is repeatedly performed, so that a top portion of the WAVE data stored in the PC buffer defined by the start address SA[x] and end address EA[x] is transferred to the P buffer of the channel x in such a way that data of thirty-two samples are transferred every DAC cycle.

Thus, a certain number of waveform samples are prepared in the P buffer of the channel x of the third RAM 32. Then, the timing generator 39 detects in step S63 (see FIG. 6B) the playback start timing, which is designated by the playback start count value PSC[x] in step S25 shown in FIG. 5A. So, in step S64, the audio playback flag APF[x] is set at "1".

In the aforementioned transfer process of FIG. 6A which is executed every sampling period, the second transfer circuit 33 detects in step S52 an event that the audio playback flag APF[x] is set at "1". So, the second transfer circuit 33 reads the waveform samples prepared in the P buffer while renewing the audio playback pointer APP[x], so that the read waveform samples are supplied to the input register of the mixer 34. The DSP 35 imparts some effect(s) appropriately to the waveform samples supplied to the mixer 34. Then, the effect-imparted waveform samples are forwarded to the D/A converter 37, wherein they are converted to analog signals. The analog signals are supplied to the sound system 29, by which the corresponding sounds are produced.

As described above, the first transfer circuit 31 operates in parallel with the second transfer circuit 33 while the second transfer circuit 33 operates for playback of waveform samples of the P buffer. If a vacant area (or unused storage capacity) of the P buffer of the channel x increases due to progress of the playback, waveform samples following the top portion of the WAVE data are sequentially transferred from the PC buffer to the P buffer.

The above is the description regarding the waveform playback operation of waveform samples of one channel stored in the PC buffer of the first RAM 12 as well as the loading operation to load waveform sample data, which are input from the microphone 28 and are produced by the analog-to-digital conversion made by the A/D converter 36. It is described before that the present waveform record/playback system is capable of executing sequence playback. Next, a description will be given with respect to operations of the present embodiment at a sequence playback mode.

FIG. 7A shows an example of a configuration of sequence data, which are used to perform sequence playback. The sequence data of FIG. 7A are basically configured by five data elements as follows:

(1) Header portion that stores a name, type and size of the data as well as time units etc.;
(2) Initial data that are used for the initial setting (or initialization);
(3) Start code;
(4) Time data and instructions (such as playback instruction and control instruction) regarding WAVE data; and
(5) End code.

In the above, the time data are followed by WAVE data and are provided to represent the timing to issue an instruction with regard to the WAVE data, wherein the timing is represented using an operation start time or relative time data. Herein, the relative time data represent an elapsed time, which elapses from a previous instruction and which is measured using units of DAC cycles.

In case of the sequence data of FIG. 7A, the instructions regarding the WAVE data contain basically three kinds of instructions as follows:

(i) Waveform playback instructions such as "W1 playback instruction" and "W3 playback instruction", which instruct to start playback of the respective WAVE data;

(ii) Instructions such as "W4 level control instruction" and "W10 level control instruction", which control playback levels of the respective WAVE data to initiate fade-in and fade-out of the WAVE data; and (iii) Waveform control instructions such as "W1 effect control instruction", which control effects (e.g., reverberation effect) imparted to the WAVE data.

In the above, the waveform playback instruction contains several pieces of information representing a name of the WAVE data, storage position (or address), sampling frequency and time required for playback.

As shown in FIG. 7B, WAVE data are respectively stored on the hard disk contained in the hard-disk drive 23. So, a number of the WAVE data required for playback of the sequence data are sequentially read from the hard disk and are loaded to the first RAM 12. In other words, the present embodiment is designed not to transfer all of the WAVE data required for playback of the sequence data to the first RAM 12 at once. That is, the present embodiment is designed to transfer a prescribed number of WAVE data, corresponding to a first set of WAVE data which are required for playback of the sequence data at first, to the first RAM 12. So, after completion of playback of one WAVE data, next WAVE data to be played back next is loaded to the first RAM 12.

Next, operations to play back the sequence data will be described with reference to FIG. 8, FIG. 9A and FIG. 9B.

Figure 8:
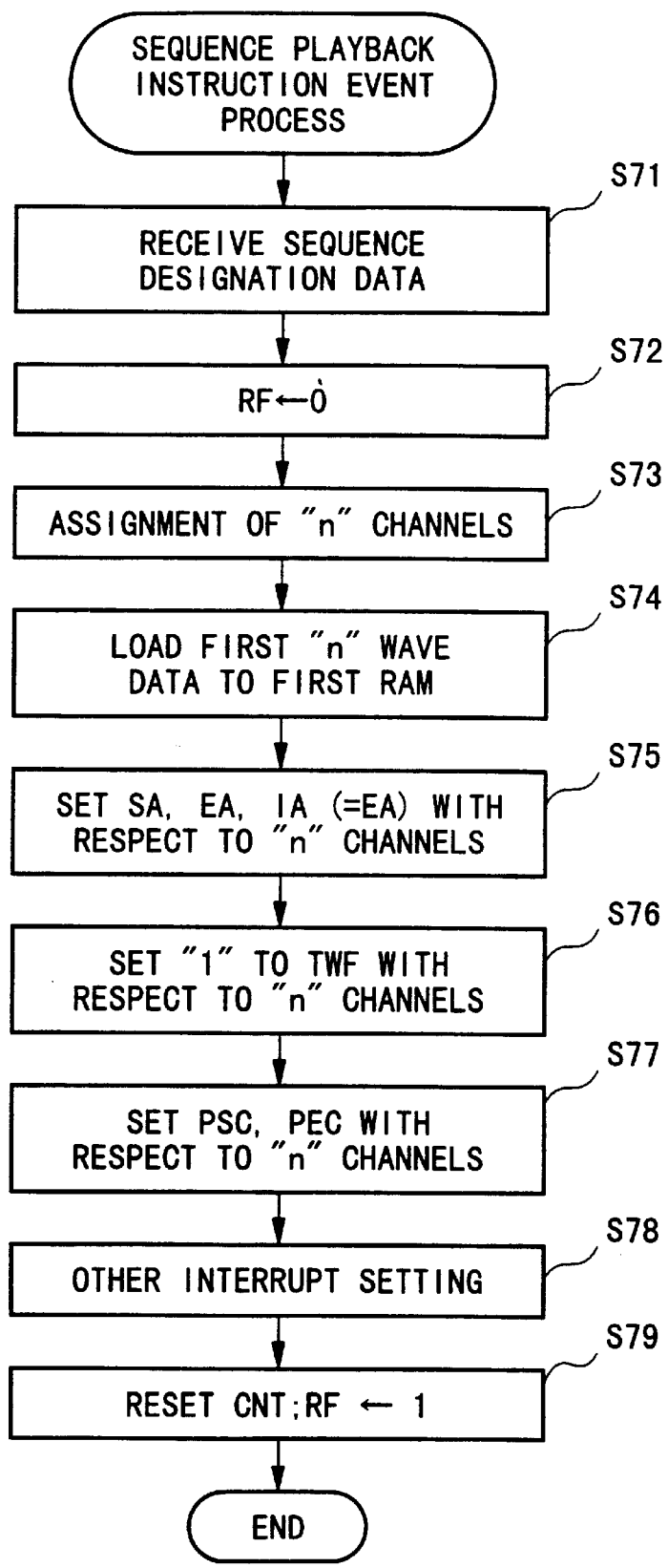
FIG. 8 is a flowchart showing a sequence playback event process.
Figure 9B:
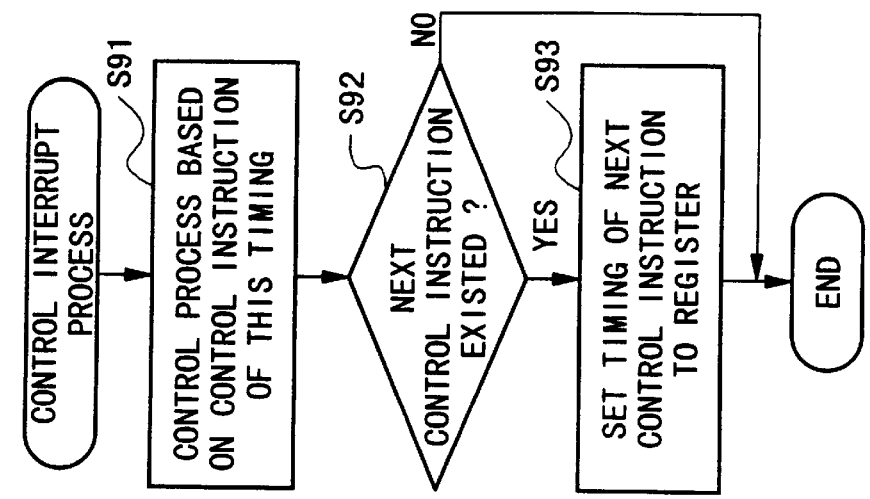
FIG. 9B is a flowchart showing a control interrupt process.

FIG. 8 is a flowchart showing a sequence playback instruction event process, which is performed in connection with the aforementioned switch process of step S15 (see FIG. 4) in response to a sequence playback instruction event. The sequence playback instruction event process of FIG. 8 is executed by the CPU 10.

At occurrence of a sequence playback instruction event, the CPU 10 proceeds to step S71, wherein it receives sequence designation data, corresponding to a sequence for playback, which are contained in the above event.

In step S72, the CPU 10 initializes the run flag RF so that RF is reset to "0". Thus, it stops operation of the counter 38.

Then, the CPU 10 transfers control to step S73, wherein the CPU 10 analyzes sequence data designated by the sequence designation data which it receives in step S71. Thus, the CPU 10 calculates a maximum number of channels (or maximum number of tracks), which are required maximally for playback of the sequence data. Such a maximum number (which will be referred to as "maximum channel number" or "maximum track number") is designated by a reference symbol "n". Thus, assignment of tone-generation channels is made in response to the maximum track number "n". Herein, the CPU 10 secures an area to store WAVE data of "n" channels in the PC buffer on the first RAM 12.

In step S74, the CPU 10 accesses the hard disk of the hard disk drive 23 to read a first set of "n" WAVE data which are played back at first in accordance with the sequence data. Then, it loads such a first set of the "n" WAVE data into the area of the PC buffer of the first RAM 12 which is secured in the foregoing step S73.

In step S75, the CPU 10 designates a set of the start address SA[x] and end address EA[x] with respect to each of storage positions of the "n" WAVE data corresponding to the "n" channels on the first RAM 12. Those addresses are set to the register 40. In addition, the CPU 10 sets an interrupt request address IA[x] to be identical to the aforementioned end address EA[x]. That is, it establishes a relationship of "IA[x]=EA[x]".

In step S76, the CPU 10 sets "1" to the transfer write flag TWF[x] with respect to each of the "n" channels. Herein, the CPU 10 produces values through the aforementioned analysis of the sequence data in step S73. In step S77, it sets those values to the playback start count value PSC[x] and playback end count value PEC[x] with respect to each of the "n" channels. That is, the CPU 10 calculates the playback start count value PSC[x] and playback end count value PEC[x] on the basis of the aforementioned time data and a playback time length (or number of waveform samples) of the WAVE data contained in the waveform playback instruction. Thus, it sets them to the register 40. With regard to the channel whose transfer write flag TWF[x] is set at "1", the first transfer circuit 31 performs the aforementioned processes of FIG. 5B and FIG. 5C, so that the WAVE data representing a top waveform to be played back in such channel are sequentially transferred from the PC buffer of the first RAM 12 to the P buffer of the third RAM 32.

In step S78, the CPU 10 calculates the timing to execute the waveform control instruction such as the level control instruction and effect control instruction on the basis of the time data contained in the sequence data. Thus, it sets a count value to the register 40 such that an interruption (i.e., control interrupt) occurs at the calculated timing. In this case, the CPU 10 firstly sets a count value to cope with a first control instruction, e.g., "W4 level control instruction" in the case of FIG. 7A.

In step S79, the CPU 10 resets the counter 38 while setting "1" to the run flag RF. Thus, it starts the counting operation of the counter 38. As described before, the counter 38 counts a number of pulses corresponding to DAC cycles. Therefore, the counting for the DAC cycles is started from "0".

As described above, on the basis of the sequence playback instruction, the CPU 10 performs preparation process which is required for sequence playback, then, it starts the playback.

Thereafter, the playbacks of the "n" WAVE data stored in the first RAM 12 are sequentially started as described before. This is performed as follows:

When the timing generator 39 detects in step S63 (see FIG. 6A) the timing of the playback start count value PSC[x], it sets "1" to the audio playback flag APF[x] of the corresponding channel (x). Thus, the second transfer circuit 33 starts playback of the P buffer (see FIG. 6A) with respect to the channel. When a vacant area is created in the P buffer due to the playback, the first transfer circuit 31 performs the foregoing processes of FIG. 5B and FIG. 5C, so that following waveforms of the WAVE data following the top waveform whose playback is ended with respect to the channel are sequentially supplied from the PC buffer to the P buffer. The playback caused by the second transfer circuit 33 is continued until the timing generator 39 detects the timing of the playback end count value PEC[x] with respect to the channel.

As described above, the WAVE data are respectively transferred from the PC buffer of the first RAM 12 to the P buffer of the third RAM 32, so that playback of the WAVE data progresses. When the transfer pointer TP[x] for the data of the PC buffer reaches the interrupt request address IA[x], a channel interrupt occurs. This channel interrupt occurs when the reading operation is completed until the end of the PC buffer with respect to the channel. In other words, occurrence of the channel interrupt indicates an event that all of the WAVE data are completely transferred to the P buffer with respect to the channel. Thus, it is possible to load to the first RAM 12 a next set of WAVE data which should be played back next. Such a load process is executed by a routine of a channel interrupt process.

Figure 9A:
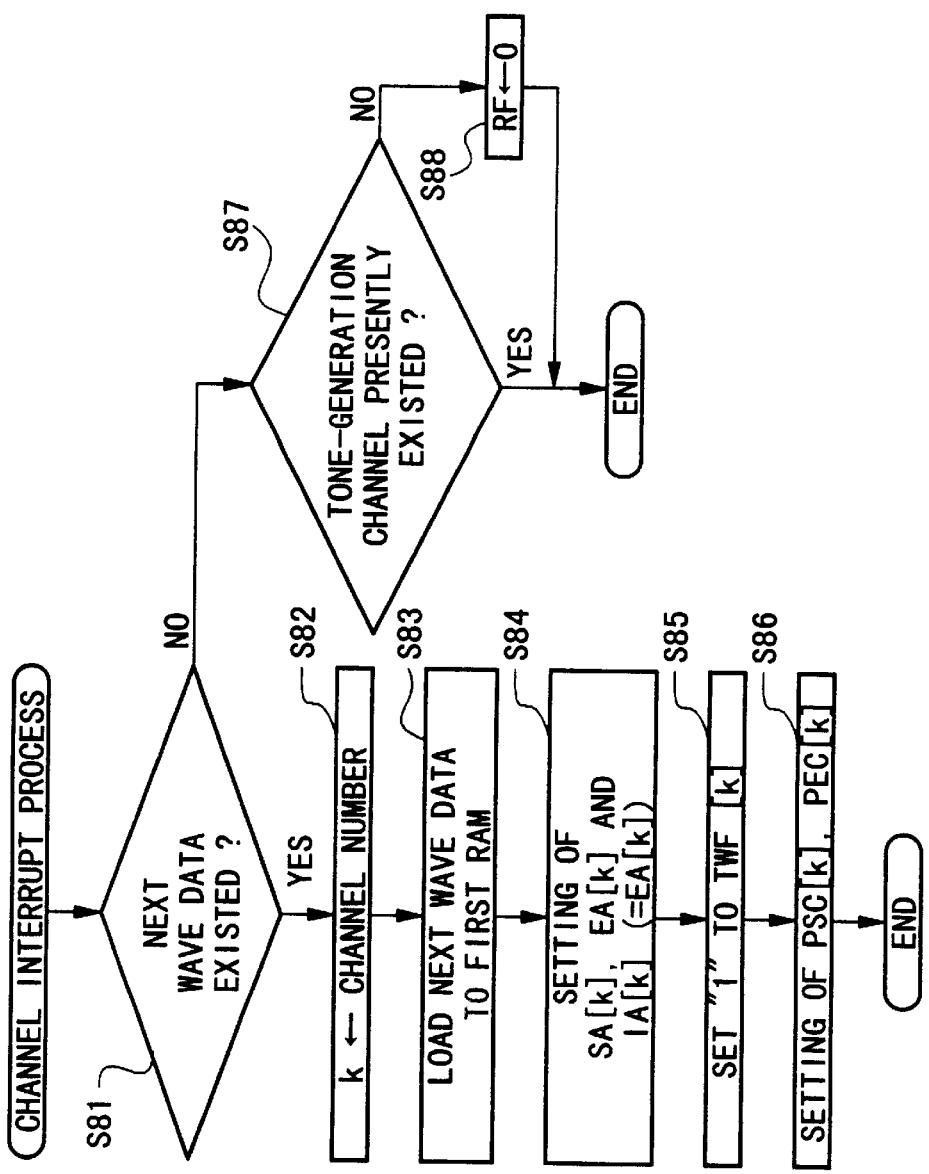
FIG. 9A is a flowchart showing a channel interrupt process.

FIG. 9A is a flowchart for explaining such a routine of the channel interrupt process. As described above, a channel interrupt is caused to occur when all of the WAVE data stored in the PC buffer of the first RAM 12 are completely transferred to the P buffer of the third RAM 32 with respect to the channel. Thus, the CPU 10 proceeds to step S81, wherein a decision is made as to whether there exists a next set of WAVE data, which should be loaded from the hard disk of the hard disk drive 23 to the PC buffer of the first RAM 12 next to the pre-loaded set of the WAVE data, or not. If all of the WAVE data representing sounds to be generated, which are designated by the sequence data, have been already loaded to the PC buffer so that no data to be transferred exist on the hard disk of the hard disk drive 23, a decision of the step S87 results in "NO", so that the CPU 10 transfers control to step S87. In step S87, a decision is made as to whether there still exists a tone-generation channel that presently contributes to waveform playback or not. If there exists no tone-generation channel presently contributing to waveform playback, it can be said that playback of all of the WAVE data is ended. So, the CPU 10 resets the run flag RF to "0" in step S88 to end the channel interrupt process. Or, if there exists the tone-generation channel(s) presently contributing to waveform playback, the CPU 10 ends the channel interrupt process.

If there remain WAVE data to be played back so that the decision result of step S81 is "YES", the CPU 10 transfers control to step S82, wherein it substitutes a channel number for a variable k. In step S83, the CPU 10 accesses the hard disk of the hard disk drive 23 to read the WAVE data, which are then loaded to the vacant area of the first RAM 12.

In step S84, the area that stores the WAVE data in the step S83 is used as a new PC buffer of channel "k". Thus, the CPU 10 determines a start address SA[k], an end address EA[k] and an interrupt request address IA[k] (where IA[k]= EA[k]), which are set to the register 40.

In step S85, "1" is set to a transfer write flag TWF[K] corresponding to the channel k. In response to such setting of TWF[k], the first transfer circuit 31 sequentially transfers the WAVE data representing the top waveform from the PC buffer to the P buffer. In step S86, the CPU 10 sets a playback start count value PSC[K] and a playback end count value PEC[K] with regard to the channel k.

In short, the operation of the present embodiment responding to occurrence of the channel interrupt can be summarized as follows:

At occurrence of the channel interrupt, a next set of data, which should be played back next to the present set of data, are transferred to the PC buffer, so that the preparation process is executed for waveform playback of the next set of data. Thus, the WAVE data are prepared for the channel k. Those WAVE data are sequentially played back in a duration between the timings designated by PSC[K] and PEC[K] respectively in accordance with the method similar to the foregoing method, which is described in connection with the preparation process of the sequence data shown in FIG. 8 and by which the "n" WAVE data are sequentially played back.

Next, a description will be given with respect to a control interrupt process with reference to a flowchart shown in FIG. 9B. Herein, the control interrupt process corresponds to the other interrupt setting of step S78 shown in FIG. 8.

Now, a count value of the counter 38 is used as the count value set to the register 40 by the aforementioned step S78, so that the control interrupt process is initiated. Thus, the CPU 10 firstly proceeds to step S91 to perform a control process based on a control instruction of this timing (e.g., "W4 level control instruction" in case of FIG. 7A). For example, the control process is carried out by writing level control data and the like, corresponding to the control instruction, into the register 40, so that level control is performed in the mixer 34 with respect to the present channel. In case of an effect control instruction, for example, corresponding DSP control parameters and the like are written into the register 40, so that a content of an effect process performed by the DSP 35 is controlled.

Next, the CPU 10 transfers control to step S92, wherein a search is made as to whether the sequence data contains a next control instruction or not. If no control instruction exists in the sequence data, the CPU 10 ends the control interrupt process.

If the CPU 10 finds out the next control instruction by the search of the step S92, the CPU 10 transfers control to step S93. In step S93, the CPU 10 performs calculations to produce timing information corresponding to the control instruction, in other words, it calculates a count value representing the timing to execute the control instruction on the basis of the time data. Then, the calculated timing information (or calculated count value) is set to the register 40. Thus, the CPU 10 ends the control interrupt process. Thereafter, at the timing of a next control instruction, the CPU 10 executes the aforementioned control interrupt process again.

Therefore, on the basis of the sequence data, the present embodiment performs playback, level control and effect control on multiple WAVE data at their timings which are designated.

As described heretofore, we have described about operations of the present embodiment with respect to the aforementioned cases such as, (1) first case where playback is performed on the WAVE data stored in the PC buffer of the first RAM 12, and (2) second case where the sequence playback is performed. Next, a description will be given with respect to the aforementioned (3) third case where direct playback is performed on the waveforms stored on the hard disk(s) and the like.

The direct playback is performed in such a way that the system performs playback while sequentially reading WAVE data of a long time stored in the external storage device such as the hard disk of the hard disk drive 23 or CD-ROM of the CD-ROM drive 24. In such direct playback, the CPU 10 sets the interrupt address IA[x] repeatedly on an intermediate position and a last position of the PC buffer. By the aforementioned interrupt process routine in which the waveform sample data are sequentially read from the external storage device and loaded to the PC buffer, it is possible to use the PC buffer of the first RAM 12 as a double buffer, by which the WAVE data of a long time can be sequentially played back.

In addition, it is possible to perform playback while receiving WAVE data from the network 26 via the network interface 27. In this case, like the aforementioned direct playback, the PC buffer is used as a double buffer.

Further, the system of this invention is capable of playing back waveform sample data, which are produced using the so-called software sound source that produces the waveform sample data using the software. In this case, the system receives MIDI data which are input thereto by means of a MIDI interface (not shown). That is, the CPU 10 performs calculations to produce musical tone waveform samples of sixteen channels, for example, based on the input MIDI data, so that the musical tone waveform samples are written into the PC buffer of the first RAM 12. Then, like the aforementioned embodiment, the system plays back waveform sample data corresponding to the musical tone waveform samples written into the PC buffer. According to the method of this invention, the DSP 35 is capable of imparting effects to the musical tones. So, as compared with the "normal" software sound source system in which the CPU performs a variety of processes including the effect process for the musical tones, it is possible to reduce an amount of load of processing to the CPU.

Lastly, it is possible to provide a variety of modifications to the embodiment within the scope of this invention, as follows:

The embodiment of this invention is designed to perform burst transfer of thirty-two samples per one channel every DAC cycle. It is possible to modify the present embodiment such that the burst transfer is performed with respect to maximally "n" channels every DAC cycle. Or, it is possible to modify the present embodiment such that a different number of samples are subjected to burst transfer with respect to each of the channels. Such modifications force the system to occupy the bus for a long time. However, the first transfer circuit 31 works well to stabilize the data transfer.

The embodiment of this invention is fixed in a number of samples (i.e., thirty-two samples) per one burst transfer. However, it is possible to modify the embodiment such that a number of samples subjected to burst transfer is changed in response to a vacant storage capacity provided for each channel. For example, forty-eight samples are subjected to burst transfer if the vacant storage capacity is relatively large, or sixty-four samples are subjected to burst transfer if the vacant storage capacity is further large. This modification is capable of reducing a probability that a transfer delay occurs in the first transfer circuit, so it is possible to improve stability in data transfer.

The embodiment of this invention is fixed in size of the buffer memory, i.e., 1k words. Of course, it is possible to provide free setting in storage capacity of the buffer memory. Herein, the stability in playback is improved as the storage capacity of the buffer memory is made large, while the circuit configuration of the system is made simple as the storage capacity of the buffer memory is made small. In addition, it is possible to provide a capability that a different storage capacity is set with respect to each of channels. In this case, the setting is made such that large storage capacity is provided for the buffer memory of the channel which the user wishes to stabilize the playback.

The embodiment of this invention is designed such that in case of the sequence playback, "n" waveform data are read from the hard disk and loaded to the memory. It is possible to provide a variety of modifications in connection with such an aspect. Herein, a first modification is made such that an upper limit is provided in capacity used for storage of waveform data on the memory. So, multiple waveform data subjected to sequence playback are treated such that they are sequentially loaded to the memory from ones to be played back first up to the upper limit. Or, a second modification is made such that a range of waveform data are set between ones corresponding to a present playback position on the sequence and ones to be played back at a future position on the sequence a prescribed time later. So, such a range of the waveform data are loaded to the memory.

The embodiment of this invention is designed such that a common number "n" is used for a number of channels to be secured and a number of waveform samples to be loaded. Of course, it is possible to use different numbers for them respectively.

The embodiment of this invention is designed such that at the start of the sequence playback, the system detects a number of channels which are required to determine a number "n" of channels which are actually used. Such a number "n" can be designated in advance with respect to each sequence data, or it can be set manually.

The embodiment of this invention is designed such that the PC buffer is located on the first RAM 12. This invention is not limited in such a manner. Namely, it is possible to locate the PC buffer on the second RAM 21. In the bottom line, the system of this invention is designed such that the PC buffer is arranged in the memory space of the CPU 10.

The embodiment of this invention is designed such that the A/D converter 36 and the D/A converter 37 are located on the sound input/output board 30. It is possible to modify the embodiment such that those circuits are not located on the sound input/output board 30 while the system is connected to an audio device and the like by means of a serial interface such as USB (i.e., Universal Serial Bus) or IEEE 1394 serial bus. In this case, the system is capable of performing input/output operations using digital data, so it is possible to avoid transmission of noise.

The embodiment of this invention uses prescribed values respectively for sizes of the P buffer and R buffer, numbers of channels for the playback and record, a number of channels used by the mixer, a number of bits contained in waveform sample data. Of course, those values are merely examples, so this invention is not limited in utilization of those values. Therefore, it is possible to change those values to other values arbitrarily selected.

The embodiment of this invention is designed such that the sound input/output board 30 is connected to the PCI bus 20. This invention is not limited in such a manner. That is, it is possible to apply other kinds of high-speed buses that are capable of performing burst transfer.

Incidentally, machine-readable media such as hard disks, floppy disks, CD-ROMs and magneto-optic disks can be provided to store programs and data that achieve the aforementioned features of this invention.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A waveform data reproduction method applicable to a sound source circuit that is connected with a central processing unit and a memory via a bus and that reproduces waveform data in response to instructions from the central processing unit, said waveform data reproduction method comprising the steps of:

receiving event data and timing data from the central processing unit, wherein the event data each designate one of waveform data to be reproduced at a timing designated by the corresponding timing data;

sequentially transferring the waveform data, which are designated by the event data and are stored in the memory under the control of the central processing unit, to a buffer memory of the sound source circuit from top portions via the bus;

generating a timing signal when a count value of a counter of the sound source circuit matches the timing designated by the timing data corresponding to the event data; and consecutively reproducing the waveform data, which are stored in the buffer memory, from the top portions in response to the timing signal.

2. A waveform data reproduction apparatus comprising:

a CPU for controlling the apparatus as a whole;

a first bus connected to the CPU;

a memory, connected to the first bus, which stores a plurality of waveform data;

a second bus provided independently of the first bus;

a buffer memory having storage areas for a plurality of channels respectively, the buffer memory being connected to the second bus and being capable of storing a part of the waveform data;

supply means for sequentially supplying the waveform data to be reproduced for each channel from the memory to the storage area of the buffer memory corresponding to each channel under the control of the CPU from top portions;

a register to which the CPU sets timing data for each channel;

a counter for counting a number of timing pulses;

timing generation means for generating a timing signal based on a count value of the counter and the timing data set to the register; and read reproduction means for reading the waveform data from the storage area of the buffer memory in response to the timing signal so as to reproduce the waveform data with respect to each channel.

3. A waveform output circuit that is connected to a central processing unit and a memory for storing a plurality of waveform data via a bus and that accesses the memory to read and reproduce the waveform data, said waveform output circuit comprising:

a buffer memory having a plurality of storage areas, each of which is capable of storing a part of the waveform data with respect to each of the plurality of channels;

supply means for supplying the waveform data stored in the memory to be reproduced in each channel from top portions under control of the central processing unit, to the storage area of the buffer memory corresponding to each channel;

a register to which timing data supplied from the central processing unit is set;

a counter for counting a number of timing pulses;

timing generation means for generating a timing signal based on a count value of the counter and the timing data set to the register; and read reproduction means for reading the waveform data from the storage area of the buffer memory in response to the timing signal so as to reproduce the waveform data with respect to each channel.

4. A sequence playback apparatus for reproducing waveform data over multiple channels whose number is set to 'n' (where 'n' is an integer arbitrarily selected), comprising:

a bus;

a central processing unit connected to the bus for controlling the apparatus;

a memory connected to the bus for storing a plurality of waveform data;

a sequence memory connected to the bus for storing a sequence of event data and timing data, wherein the event data each designate one of the plurality of waveform data to be reproduced at a timing designated by the corresponding timing data; and a playback unit connected to the bus for reproducing the waveform data in each channel under the control of the central processing unit;

wherein when the playback unit completes reproducing one waveform data designated by one event data in one channel among the 'n' channels, the central processing unit assigns next event data next to one event data, so that the central processing unit supplies the next waveform data, designated by the next event data within the plurality of waveform data, and the corresponding timing data to the playback unit;

and wherein the playback unit further comprises a buffer memory having 'n' storage areas corresponding to the 'n' channels respectively;

storing means for sequentially storing the waveform data from a top portion, which is supplied from the central processing unit, in one of the storage areas of the buffer memory in correspondence with the channel being assigned under the control of the central processing unit;

a counter for counting a number of timing pulses;

generating means for sequentially generating timing signals when a count value of the counter matches the timing designated by the timing data supplied from the central processing unit; and reproduction means for sequentially reproducing the waveform data, which are designated by the event data in correspondence with the timing data and are stored in the buffer memory, from top portions in response to the timing signals.

5. A waveform reproduction method comprising the steps of:

accessing a memory to read waveform sample data comprising a plurality of waveform samples with respect to each of channels;

performing burst transfer on the waveform sample data to be transferred to a buffer memory via a bus with respect to each of the channels;

transferring reproduction timing data with respect to each of the channels via the bus;

counting a number of timing pulses;

designating the reproduction timing based on the counted value and the reproduction timing data in respect to each of the channels;

transferring each of the plurality of waveform samples with respect to each of the channels to a digital audio circuit every sampling period in response to the reproduction timing; and producing sound based on an output of the digital audio circuit.

6. A sequence playback method comprising the steps of:

loading waveform sample data comprising a plurality of waveform samples to a first memory with respect to a plurality of channels in response to sequence playback instructions;

performing burst transfer with respect to each of the plurality of channels so that the waveform sample data are sequentially transferred from the first memory to a second memory via a bus;

transferring timing data with respect to each of the channels via the bus;

counting a number of timing pulses;

generating timing signals when the counted number of the timing pulses matches the timing designated by the timing data in respect to each of the channels;

starting data transfer so that the waveform sample data are transferred from the second memory to a digital audio circuit;

performing digital audio processing on the waveform sample data in the digital audio circuit in accordance with sequence data corresponding to the sequence playback instruction; and sequentially reproducing the waveform sample data subjected to the digital audio processing in response to the timing signals.

7. A sequence playback method according to claim 6 further comprising the steps of:

detecting occurrence of a channel interrupt which is caused to occur when the burst transfer is completed with respect to one of the plurality of channels;

detecting a channel which differs from the plurality of channels and whose waveform sample data should be loaded to the first memory; and further loading the waveform sample data of the channel to the first memory.

8. A machine-readable media storing waveform sample data and programs that cause an audio playback system incorporating a computer to perform a sequence playback method comprising the steps of:

loading waveform sample data comprising a plurality of waveform samples to a first memory with respect to a plurality of channels in response to sequence playback instructions;

performing burst transfer with respect to each of the plurality of channels so that the waveform sample data are sequentially transferred from the first memory to a second memory via a bus;

transferring timing data with respect to each of the channels via the bus;

counting a number of timing pulses;

generating timing signals when the counted number of the timing pulses matches the timing designated by the timing data in respect to each of the channels;

starting data transfer so that the waveform sample data are transferred from the second memory to a digital audio circuit;

performing digital audio processing on the waveform sample data in the digital audio circuit in accordance with sequence data corresponding to the sequence playback instruction; and sequentially reproducing the waveform sample data subjected to the digital audio processing in response to the timing signals.

9. A sound source circuit that is connected to a central processing unit and a memory via a bus and that reproduces waveform data in response to instructions from the central processing unit, said sound source circuit comprising:

a receiving section for receiving event data and corresponding timing data from the central processing unit, wherein the event data each designate the waveform data to be reproduced at the timing designated by the corresponding timing data;

a buffer memory;

a transfer section for sequentially transferring the waveform data designated by the event data from the memory to the buffer memory via the bus under the control of the central processing unit, so that the transferred waveform data are stored in the buffer memory;

a timing generation section for generating a timing signal when a count value of a counter of the sound source circuit matches the timing designated by the timing data; and a playback section for reproducing the waveform data stored in the buffer memory in response to the timing signal.

10. A waveform playback method for reproducing waveform data in response to instructions from a central processing unit by means of a playback unit connected to the central processing unit, and a memory via a bus, said waveform playback method comprising the steps of:

sequentially transferring waveform data stored in the memory portion by portion, from top portions of the waveform data to the buffer memory in the playback unit via the bus under the control of the central processing unit;

generating a timing signal when a count value of a counter for counting a number of timing pulses matches timing data designated by the central processing unit; and sequentially reproducing the waveform data stored in the buffer memory from top portions in response to the timing signal.

11. A waveform playback apparatus comprising:

a bus operable in burst transfer;

a memory connected to the bus for storing waveform sample data comprising a plurality of waveform samples;

a central processing unit connected to the bus for controlling the waveform playback apparatus; and a playback unit connected to the bus for reproducing the waveform sample data, wherein the central processing unit executes the steps of accessing the memory to read the waveform sample data;

performing the burst transfer on the waveform sample data to a buffer memory via the bus with respect to each of channels; and transferring playback timing data with respect to each of the channels to the playback unit via the bus, and wherein the playback unit executes the steps of counting a number of timing pulses;

designating the playback timing based on the counted value and the playback timing data in respect to each of the channels;

transferring each of the plurality of waveform samples with respect to each of the. channels to a digital audio circuit every sampling period in response to the playback timing; and producing sound based on an output of the digital audio circuit.

* * * * *

UNITED STATES PATENT AND TRADEMARK OFFICE
CERTIFICATE OF CORRECTION

PATENT NO.   : 6,553,436 B2
DATED        : April 22, 2003
INVENTOR(S)  : Tokiharu Ando and Takashi Suzuki It is certified that error appears in the above-identified patent and that said Letters Patent is hereby corrected as shown below:

Title page, Item [54] and Column 1, lines 1-4,
Should read -- SYSTEM FOR USING TIMING DATA FROM CPU TO CONTROL THE REPRODUCTION OF WAVEFORM BASED UPON WAVEFORM DATA RECEIVED FROM SYSTEM MEMORY --

Signed and Sealed this

Twentieth Day of January, 2004

JON W. DUDAS
*Acting Director of the United States Patent and Trademark Office*